United States Patent
Iwata

(10) Patent No.: US 11,272,421 B2
(45) Date of Patent: Mar. 8, 2022

(54) DATA TRANSFER PATH CALCULATION DEVICE AND DATA TRANSFER TERMINAL

(71) Applicant: DENSO CORPORATION, Kariya (JP)

(72) Inventor: Naoki Iwata, Kariya (JP)

(73) Assignee: DENSO CORPORATION, Kariya (JP)

( * ) Notice: Subject to any disclaimer, the term of this patent is extended or adjusted under 35 U.S.C. 154(b) by 27 days.

(21) Appl. No.: 16/826,705

(22) Filed: Mar. 23, 2020

(65) Prior Publication Data

US 2020/0229065 A1    Jul. 16, 2020

Related U.S. Application Data

(63) Continuation of application No. PCT/JP2018/035235, filed on Sep. 24, 2018.

(30) Foreign Application Priority Data

Sep. 25, 2017 (JP) .............................. JP2017-183837

(51) Int. Cl.
  *H04W 40/22* (2009.01)
  *H04W 4/46* (2018.01)
  *H04W 40/20* (2009.01)

(52) U.S. Cl.
  CPC ............. *H04W 40/22* (2013.01); *H04W 4/46* (2018.02); *H04W 40/20* (2013.01)

(58) Field of Classification Search
  CPC ....... H04W 4/44; H04W 88/04; H04W 40/18; H04W 40/12; H04W 4/46; H04W 84/22;
  (Continued)

(56) References Cited

U.S. PATENT DOCUMENTS

| 7,948,966 | B2 * | 5/2011 | Hughes ................... H04L 45/16 370/351 |
| 9,036,509 | B1 * | 5/2015 | Addepalli ............... H04L 51/02 370/259 |

(Continued)

FOREIGN PATENT DOCUMENTS

JP    2014-096630 A    5/2014

OTHER PUBLICATIONS

Hull et al. Cartel: A Distributed Mobile Sensor Computing System, 2006, SenSys '06, in 14 pages.

*Primary Examiner* — Man U Phan
(74) *Attorney, Agent, or Firm* — Maschoff Brennan

(57) ABSTRACT

A data transfer path calculation device includes: a travel plan acquisition section that acquires a travel plan composed of routes on which vehicles are estimated to travel and passage times at which the vehicles are estimated to pass through points on the routes; a communication environment acquisition section that, for each of wireless base stations, acquires communication environment information indicating a communication environment for communicating with the corresponding one of the wireless base stations at points; and a transfer path calculation section that searches for a data transfer path based on the travel plan and the communication environment information, the data transfer path being a path through which data sequentially passes, among the vehicles, from an acquisition vehicle through one or more relay vehicles by inter-vehicle communication and from a last relay vehicle among the relay vehicles, the data finally reaching a server via one of the wireless base stations.

5 Claims, 8 Drawing Sheets

(58) Field of Classification Search
CPC ...... H04W 40/22; H04W 40/20; G01C 21/36;
H04L 67/12
USPC ........................................................ 370/315
See application file for complete search history.

(56) References Cited

U.S. PATENT DOCUMENTS

| | | | | |
|---|---|---|---|---|
| 9,948,717 | B2* | 4/2018 | Onishi | H04L 61/2503 |
| 10,419,519 | B2* | 9/2019 | Yamamura | H04W 84/005 |
| 10,511,393 | B2* | 12/2019 | Hall | H04W 76/10 |
| 10,834,657 | B2* | 11/2020 | Nakata | H04L 45/124 |
| 10,924,192 | B2* | 2/2021 | Kumabe | G06Q 20/341 |
| 10,972,313 | B2* | 4/2021 | Imamura | H04L 47/6215 |
| 10,999,394 | B2* | 5/2021 | Kagara | H04W 76/18 |
| 11,039,384 | B2* | 6/2021 | Ushida | G08G 1/09 |
| 2014/0200019 | A1* | 7/2014 | Nishina | H04M 15/8033 455/452.1 |
| 2015/0296019 | A1 | 10/2015 | Onishi et al. | |
| 2016/0212675 | A1 | 7/2016 | Choi | |
| 2020/0186980 | A1* | 6/2020 | Furuyama | H04W 4/80 |
| 2020/0357278 | A1* | 11/2020 | Fujii | G08G 1/093 |

* cited by examiner

FIG.11

| DATA IN STORAGE SECTION OF SERVER |
|---|
|   COMMUNICATION ENVIRONMENT INFORMATION |
|     COMMUNICATION AREA INFORMATION |
|     COMMUNICATION EXCELLENCE LEVEL TABLE |
|     BASE STATION SITUATION INFORMATION |
|   VEHICLE-MOUNTED-DEVICE-SPECIFIC COMMUNICATION FUNCTION INFORMATION |
|   VEHICLE-MOUNTED-DEVICE-SPECIFIC SENSOR INFORMATION |
|   CORRESPONDENCE RELATIONSHIP BETWEEN EVENT TYPE INFORMATION AND PREDETERMINED TIME |
|   CORRESPONDENCE RELATIONSHIP BETWEEN EVENT TYPE INFORMATION AND DELAY ALLOWABLE TIME |
|   VEHICLE SITUATION INFORMATION |
|     CURRENT POSITION |
|     MOVING SPEED |
|     DIRECTION OF MOVEMENT |
|     TRAVEL PLAN |
|       ROUTE |
|       PASSAGE TIME FOR EACH POINT ON ROUTE |
|     IDENTIFICATION INFORMATION ON VEHICLE-MOUNTED DEVICE |
| INQUIRY INFORMATION |
|   TARGET POSITION INFORMATION |
|   DATA TYPE INFORMATION |
|   EVENT TYPE INFORMATION |
|   ACQUISITION TIME LIMIT INFORMATION |
|   DELAY LIMIT INFORMATION |
| DATA REQUEST |
|   PROCEDURE ID |
|   TARGET POSITION INFORMATION |
|   DATA TYPE INFORMATION |
|   EVENT TYPE INFORMATION |
|   ACQUISITION TIME LIMIT INFORMATION |
|   DELAY LIMIT INFORMATION |
| TRANSFER INFORMATION |
|   PROCEDURE ID |
|   TRANSFER DESTINATION ADDRESS |
|   BACKUP PRESENCE INFORMATION |
|   TRANSFER ALLOWABLE TIME LIMIT |
| REQUEST DATA |
|   PROCEDURE ID (ONLY WHEN TRANSFERRED) |
|   ACQUIRED DATA |
| BASE STATION SITUATION INFORMATION |
|   CONNECTED TERMINAL NUMBER |
|   COMMUNICATION DATA AMOUNT |

DATA TRANSFER PATH CALCULATION DEVICE AND DATA TRANSFER TERMINAL

CROSS-REFERENCE TO RELATED APPLICATION

The present application is based on and claims the benefit of priority from earlier Japanese Patent Application No. 2017-183837 filed on Sep. 25, 2017, the description of which is incorporated herein by reference.

BACKGROUND

Technical Field

The present disclosure relates to a data transfer path calculation device and a data transfer terminal.

Related Art

In a conventional technique, when data needs to be transmitted from a vehicle to a server, the data is transmitted from the vehicle to the server through one or more relay vehicles.

SUMMARY

As an aspect of the embodiment, a data transfer path calculation device includes: a travel plan acquisition section that acquires a travel plan composed of a plurality of routes on which a plurality of vehicles are estimated to travel and passage times at which the plurality of vehicles are estimated to pass through a plurality of points on the plurality of routes; a communication environment acquisition section that, for each of a plurality of wireless base stations, acquires communication environment information indicating a communication environment for communicating with the corresponding one of the plurality of wireless base stations at a plurality of points; and a transfer path calculation section that searches for a data transfer path on the basis of the travel plan and the communication environment information, the data transfer path being a path through which data sequentially passes, among the plurality of vehicles, from an acquisition vehicle through one or more relay vehicles by inter-vehicle communication and from a last relay vehicle among the one or more relay vehicles, the data finally reaching a server via one of the plurality of wireless base stations.

BRIEF DESCRIPTION OF THE DRAWINGS

In the accompanying drawings:

FIG. 11 is a diagram showing a configuration of various data; and

DETAILED DESCRIPTION OF THE PREFERRED EMBODIMENTS

A conventional technique is described, for example, in JP 2014-96630 A in which when data needs to be transmitted from a vehicle to a server, the data is transmitted from the vehicle to the server through one or more relay vehicles.

According to the study by the inventor, in the technique of JP 2014-96630 A, there is no guarantee at all that the relay vehicle to which data is transmitted by inter-vehicle communication will be able to transmit the data to the server. Thus, the data is less likely to be delivered to the server.

An object of the present disclosure is to improve, in a technique in which data is transmitted from a vehicle to a server through one or more relay vehicles, the probability that the data is delivered to the server.

Figure 1:
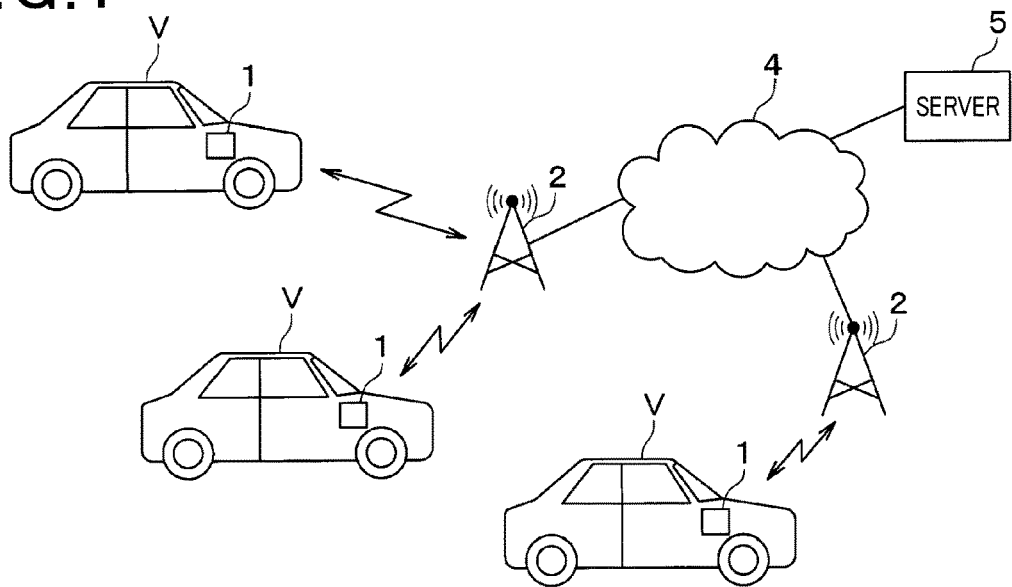
FIG. 1 is a general configuration diagram of a communication system.

An embodiment of the present disclosure will be described below. As shown in FIG. 1, a communication system according to the present embodiment includes a plurality of vehicles V, a plurality of vehicle-mounted devices 1, a plurality of wireless base stations 2, a wide-area network such as the Internet, and a server 5.

The plurality of vehicle-mounted devices 1 have a one-to-one correspondence with the plurality of vehicles V. Each of the plurality of vehicle-mounted devices 1 is mounted on the corresponding one of the plurality of vehicles V. The number of vehicles V may be approximately 100, approximately 10000, or more. The plurality of vehicle-mounted devices 1 each correspond to a terminal.

Each of the plurality of vehicle-mounted devices 1 is connected to one of the plurality of wireless base stations 2, and transmits various types of information to the server 5 via the wireless base station 2 to which the corresponding one of the plurality of vehicle-mounted devices 1 is connected and a wide-area network 4. Furthermore, each of the plurality of vehicle-mounted devices 1 mounted on the corresponding one of the vehicles V performs inter-vehicle communication with the vehicle-mounted device 1 mounted on another one of the vehicles V located near the corresponding one of the plurality of vehicle-mounted devices 1.

Figure 2:
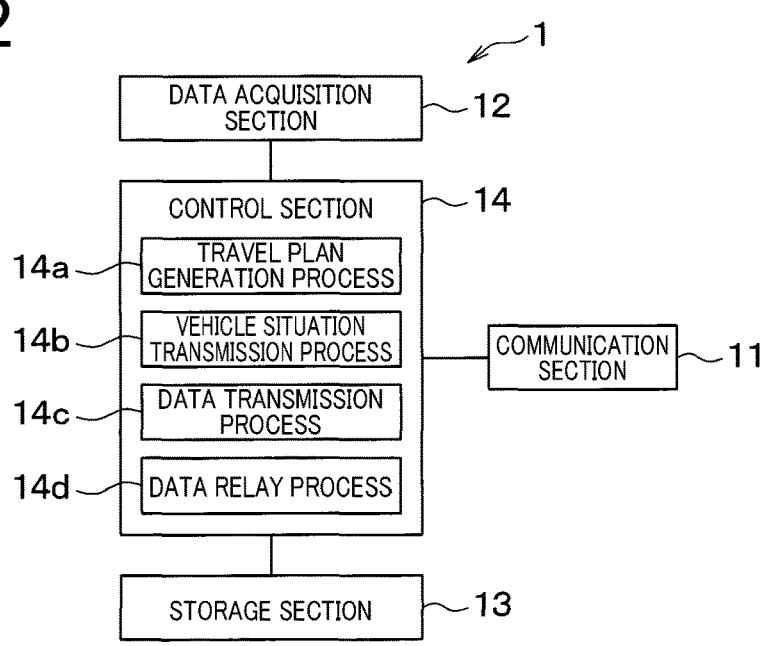
FIG. 2 is a configuration diagram of a vehicle-mounted device.

A configuration of the communication system will be described in detail below. As shown in FIG. 2, each of the plurality of vehicle-mounted devices 1 includes a communication section 11, a data acquisition section 12, a storage section 13, and a control section 14.

The communication section 11 is a communication interface for wirelessly communicating with a communication device external to the vehicle V on which the corresponding one of the plurality of vehicle-mounted devices 1 is mounted. Examples of the external communication device for the communication section 11 of each of the plurality of vehicle-mounted devices 1 include the plurality of vehicle-mounted devices 1 other than the corresponding one of the plurality of vehicle-mounted devices 1, and the plurality of wireless base stations 2.

The communication section 11 can use a plurality of different wireless communication systems. For example, the communication section 11 can use both a wireless communication system according to a wireless LAN standard such as IEEE 802.11 and a wireless communication system according to a mobile communication system standard such as LTE or a third-generation mobile communication system. LTE is an abbreviation for Long Term Evolution.

The data acquisition section 12 includes a group of sensors that detect a state of the vehicle V on which the vehicle-mounted device 1 is mounted and a situation around the vehicle V. Specifically, the data acquisition section 12 includes a camera that captures an image of areas in front of, on the sides of, and behind the vehicle V. Furthermore, the data acquisition section 12 includes a vehicle speed sensor that detects a vehicle speed of the vehicle V. Furthermore, the data acquisition section 12 includes an acceleration sensor that detects longitudinal acceleration and lateral acceleration of the vehicle V. Furthermore, the data acquisition section 12 includes a satellite navigation receiver (e.g., GPS receiver) that detects a position of the vehicle V.

The storage section 13 is a storage medium for storing a program that describes a process performed by the control section 14 and various data generated by the control section 14. The storage section 13 is a non-transitory tangible storage medium.

The control section 14 is a microcomputer including a CPU, a RAM, a ROM, and the like. The control section 14 is capable of acquiring data by using the data acquisition section 12, performing communication using the communication section 11, and storing data in the storage section 13 and reading the data from the storage section 13. The RAM and the ROM are each a non-transitory tangible storage medium.

Examples of the process performed by the control section 14 by reading the program from the storage section 13 include a travel plan generation process 14a, a vehicle situation transmission process 14b, a data transmission process 14c, and a data relay process 14d. Contents of these processes will be described later.

Figure 3:
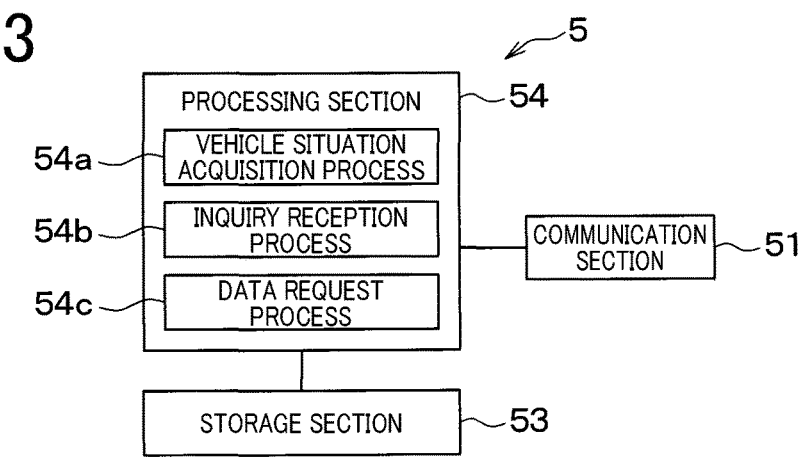
FIG. 3 is a configuration diagram of a server.

As shown in FIG. 3, the server 5 includes a communication section 51, a storage section 53, and a processing section 54. The communication section 51 communicates with the plurality of vehicle-mounted devices 1 via the wide-area network 4 and the plurality of wireless base stations 2. The storage section 53 is a storage medium that stores a program that describes a process performed by the processing section 54, data received from the plurality of vehicle-mounted devices 1, and the like. The server 5 corresponds to a data transfer path calculation device.

The storage section 53 also stores communication environment information, vehicle-mounted-device-specific communication function information, vehicle-mounted-device-specific sensor information, a plurality of communication quality level tables, and a plurality of pieces of base station situation information. The vehicle-specific communication function information is information indicating, for each of the plurality of vehicle-mounted devices 1, a wireless communication system that can be used by the communication section 11 of the corresponding one of the plurality of vehicle-mounted devices 1 to communicate with the server 5. The vehicle-mounted-device-specific sensor information is information indicating, for each of the plurality of vehicle-mounted devices 1, a sensor (e.g., camera, radar sensor, GPS receiver) included in the data acquisition section 12 of the corresponding one of the plurality of vehicle-mounted devices 1.

The communication environment information is information indicating, for each of the plurality of wireless base stations 2, a communication environment for communicating with the corresponding one of the plurality of wireless base stations at a plurality of points. Specifically, the communication environment information includes communication area information, the plurality of communication quality level tables, and the plurality of pieces of base station situation information. The communication area information is information indicating, for each of the plurality of wireless base stations 2, a range (i.e., communication area) of positions at which communication with the corresponding one of the plurality of wireless base stations 2 is possible. Contents of the plurality of communication quality level tables and the plurality of pieces of base station situation information will be described later.

The processing section 54 is a microcomputer including a CPU, a RAM, a ROM, and the like. The processing section 54 is capable of performing communication using the communication section 51, and storing data in the storage section 53 and reading the data from the storage section 53. The RAM, the ROM, and the storage section 53 are all a non-transitory tangible storage media.

Example of the process performed by the processing section 54 by reading the program from the storage section 53 include a vehicle situation acquisition process 54a, an inquiry reception process 54b, and a data request process 54c. Contents of these processes will be described later.

Operation of the communication system having the configuration as described above will be described below. First, in each of the plurality of vehicle-mounted devices 1, the control section 14 of the corresponding one of the plurality of vehicle-mounted devices 1 performs the travel plan generation process 14a. In the travel plan generation process 14a, the control section 14 acquires a destination that has been set, for example, by an occupant of the vehicle V on which the vehicle-mounted device 1 is mounted. Then, on the basis of well-known road map data in the storage section 13, for example, by using the Dijkstra method, the control section 14 calculates a route on which the vehicle V is estimated to travel from a start position (e.g., current position) to the destination.

Furthermore, in the travel plan generation process 14a, for each of a plurality of points on the calculated route, the control section 14 calculates a passage time at which the vehicle V is estimated to pass through the corresponding one of the plurality of points. The passage times are calculated on the basis of a start time (e.g., current time), a traveling speed of the vehicle V on the route to the destination, traffic jam information, and the like. The traveling speed may be a fixed value, or may be calculated on the basis of a vehicle speed provided for each link in the road map data. The traffic jam information may be acquired, for example, via a traffic jam information receiver mounted on the vehicle V. The information obtained in this manner on the route and the passage times at the plurality of points on the route constitute a travel plan.

Furthermore, in the travel plan generation process 14a, on the basis of the current position and the destination of the vehicle V, the control section 14 repeatedly and periodically creates a new version of the travel plan already created.

In each of the plurality of vehicle-mounted devices 1, the control section 14 of the corresponding one of the plurality of vehicle-mounted devices 1 performs the vehicle situation transmission process 14b. In the vehicle situation transmission process 14b, the control section 14 repeatedly generates vehicle situation information including a current position, a moving speed, a direction of movement, a travel plan, and identification information (e.g., MAC address) on the vehicle-mounted device 1 of the vehicle V on which the vehicle-mounted device 1 is mounted. MAC is an abbreviation for media access control. In the vehicle situation transmission process 14b, by using the communication section 11, the control section 14 repeatedly and periodically transmits the latest vehicle situation information to the server 5 via the closest wireless base station 2 with which the communication section 11 can communicate and the wide-area network 4.

In the vehicle situation acquisition process 54a, by using the communication section 51, the processing section 54 of the server 5 receives the vehicle situation information repeatedly transmitted as described above from each of the plurality of vehicle-mounted devices 1. Then, the processing section 54 stores the received vehicle situation information in the storage section 53. At that time, the storage section 53 deletes another piece of vehicle situation information including the same identification information on the vehicle-mounted device 1 as the received vehicle situation information. Thus, for each of the plurality of vehicles V, the storage section 53 stores the latest vehicle situation information associated with the corresponding one of the plurality of vehicles V.

In the inquiry reception process 54b, the processing section 54 receives inquiry information from an inquiry source communication device (not shown) connected to the wide-area network 4, and stores the received inquiry information in the storage section 53.

The inquiry information is information on contents of data required by the inquiry source communication device. The inquiry information includes target position information and data type information. Furthermore, the inquiry information may include event type information. Furthermore, the inquiry information may include acquisition time limit information. Furthermore, the inquiry information may include delay limit information.

The target position information is position information (i.e., latitude, longitude) on a place in which the required data can be acquired. The data type information is information indicating a type (e.g., captured image, sound, vehicle speed, or the like) of the required data. The event type information is an event (e.g., accident situation, parking lot vacancy information, traffic jam situation, or the like) found from the required data. The acquisition time limit information is information indicating the last allowable time point which the required data must be acquired by. The delay limit information is a maximum value of an allowable length as a length of an interval from a time point at which the required data was acquired at the place in which the required data can be acquired to a time point at which the data is received by the server 5.

For example, when the inquiry source communication device requires information on an accident that has occurred at a specific point X, inquiry information transmitted from the inquiry source communication device is configured as described below. First, the target position information indicates position information on the point X. The data type information indicates a captured image. The event type information indicates a type "accident situation". The acquisition time limit information indicates, for example, a time 1 hour after the occurrence of the accident. The delay limit information indicates, for example, 1 hour.

For example, when the inquiry source communication device requires parking lot vacancy information on a specific point X corresponding to a road parking, inquiry information transmitted from the inquiry source communication device is configured as described below. First, the target position information indicates position information on the point X. The data type information indicates a captured image. The event type information indicates a type "parking lot vacancy information". The acquisition time limit information indicates that there is no time limit. The delay limit information indicates, for example, 30 minutes, which is shorter than in the case of the accident information.

For example, when the inquiry source communication device requires a traffic jam situation at a specific point X, inquiry information transmitted from the inquiry source communication device is configured as described below. First, the target position information indicates position information on the point X. The data type information indicates a vehicle speed. The event type information indicates a type "traffic jam situation". The acquisition time limit information indicates a time 1 hour from the current time. The delay limit information indicates, for example, 15 minutes, which is shorter than in the case of the parking lot vacancy information.

In response to new inquiry information being stored in the storage section 53 by the inquiry reception process 54b, the processing section 54 of the server 5 performs the data request process 54c.

Figure 4:
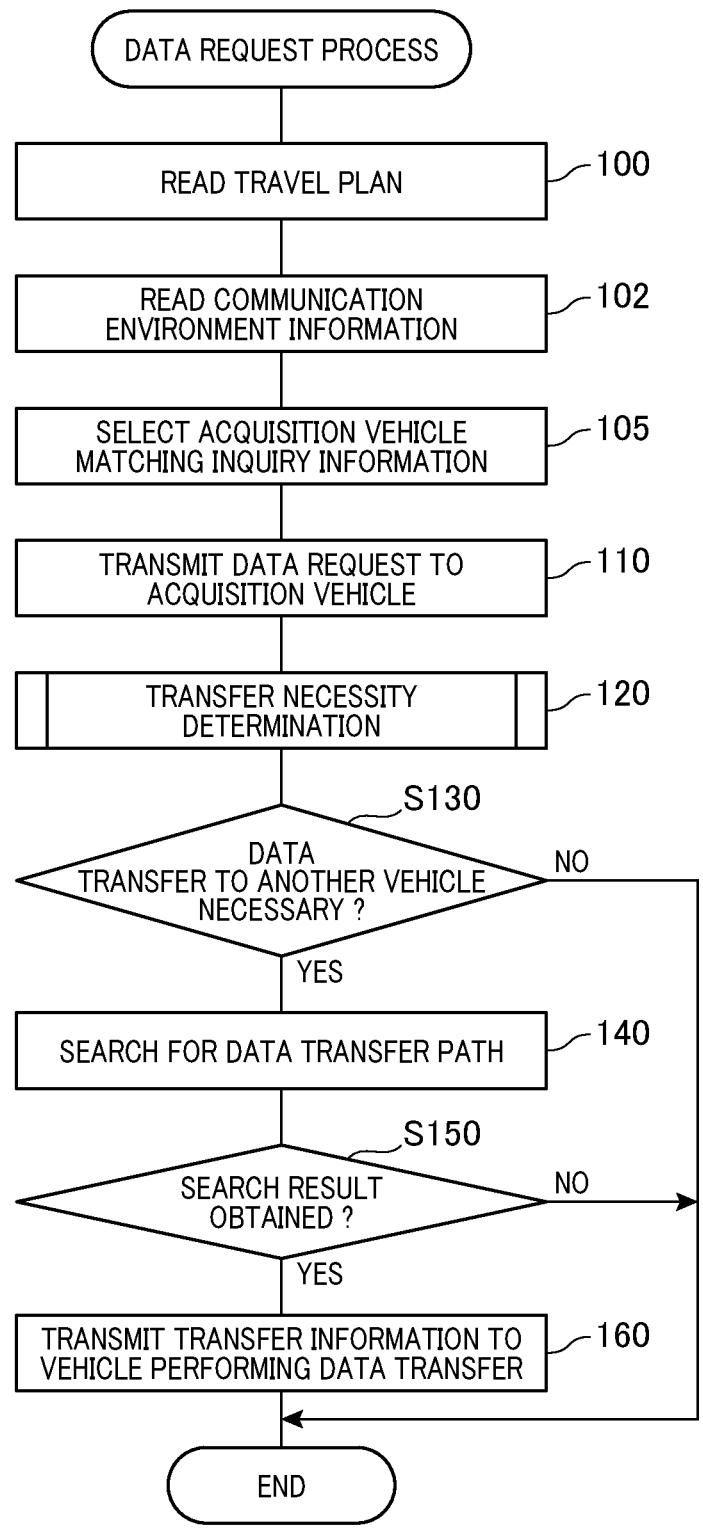
FIG. 4 is a flow chart of a data request process.

FIG. 4 shows a flow chart of the data request process 54c. In the data request process 54c, first, at step 100, the processing section 54 reads and acquires the travel plans of the plurality of vehicles V stored in the storage section 53. At subsequent step 102, the processing section 54 reads and acquires the communication environment information stored in the storage section 53.

Subsequently, at step 105, the processing section 54 reads the latest inquiry information stored in the storage section 53, and from the plurality of vehicles V, the processing section 54 selects a vehicle V that matches the inquiry information. The vehicle V that matches the inquiry information is a vehicle V on which the vehicle-mounted device 1 capable of acquiring required information in the inquiry information is mounted.

The process at step 105 will be more specifically described. When the inquiry information includes, as described above, the position information on the point X and the type information indicating that a captured image at the point X is required, at step 105, the processing section 54 performs the following process.

First, by using the travel plans in the vehicle situation information on all the vehicles V included in the storage section 53, the processing section 54 searches for a vehicle V that travels at a point in the vicinity of the point X within a predetermined time (e.g., 10 minutes, 20 minutes, 30 minutes) from the current time. The point in the vicinity of the point X is a point located within a predetermined distance (e.g., 10 meters) from the point X. Furthermore, by using a current position in the vehicle situation information on one or more vehicles V extracted as a result of the search, the processing section 54 searches for a vehicle V that is located at a position at which the vehicle V can communicate with one of the plurality of wireless base stations 2 at the current time point. Furthermore, by using the vehicle-mounted-device-specific sensor information in the storage section 53, among one or more vehicles V extracted as a result of the search, the processing section 54 searches for a vehicle V in which the vehicle-mounted device 1 includes a camera. The vehicle V extracted as a result of the search is selected by the processing section 54 as the vehicle V capable of acquiring required information in the inquiry information.

The number of vehicles V selected in this manner may be one or more. In the next and subsequent paragraphs, the case where a single vehicle V is selected will be described. Even when a plurality of vehicles V are selected, operation as described in the next and subsequent paragraphs is achieved for each of the plurality of vehicles V. Hereinafter, the selected vehicle V is referred to as an acquisition vehicle V.

Figure 5:
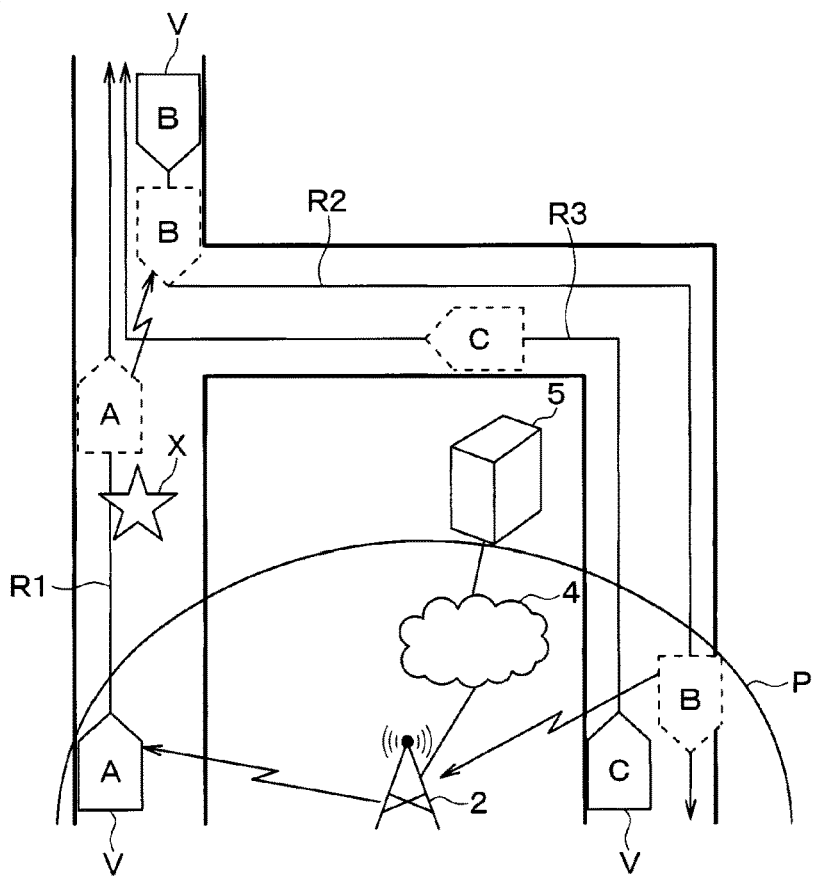
FIG. 5 is a diagram schematically showing a first case.

For example, as shown in FIG. 5, the selected vehicle V may be a vehicle A that is currently located in a communication area P of the wireless base station 2, and passes through the vicinity of the point X within a predetermined time from the current time according to the travel plan. Hereinafter, the example shown in FIG. 5 is referred to as a first case.

The predetermined time may be a time according to the acquisition time limit information in the inquiry information. When no acquisition time limit information is included in the inquiry information, the predetermined time may be a time corresponding to the event type information in the inquiry information. A correspondence relationship between the event type information and the predetermined time is stored in advance in the storage section 53. When neither acquisition time limit information nor event type information is included in the inquiry information, the predetermined time may be a fixed value (e.g., 5 minutes).

Subsequently, at step 110, the processing section 54 creates a data request including the same content as the inquiry information, and in the data request, the processing section 54 further includes a unique procedure ID. The procedure ID is a unique code for identifying a single data request from a plurality of data requests. Then, by using the communication section 51, the processing section 54 transmits the data request to the vehicle-mounted device 1 mounted on the acquisition vehicle V serving as a destination of the data request. The vehicle-mounted device 1 serving as the destination is determined by the identification information included in the vehicle situation information corresponding to the acquisition vehicle V.

Figure 6:
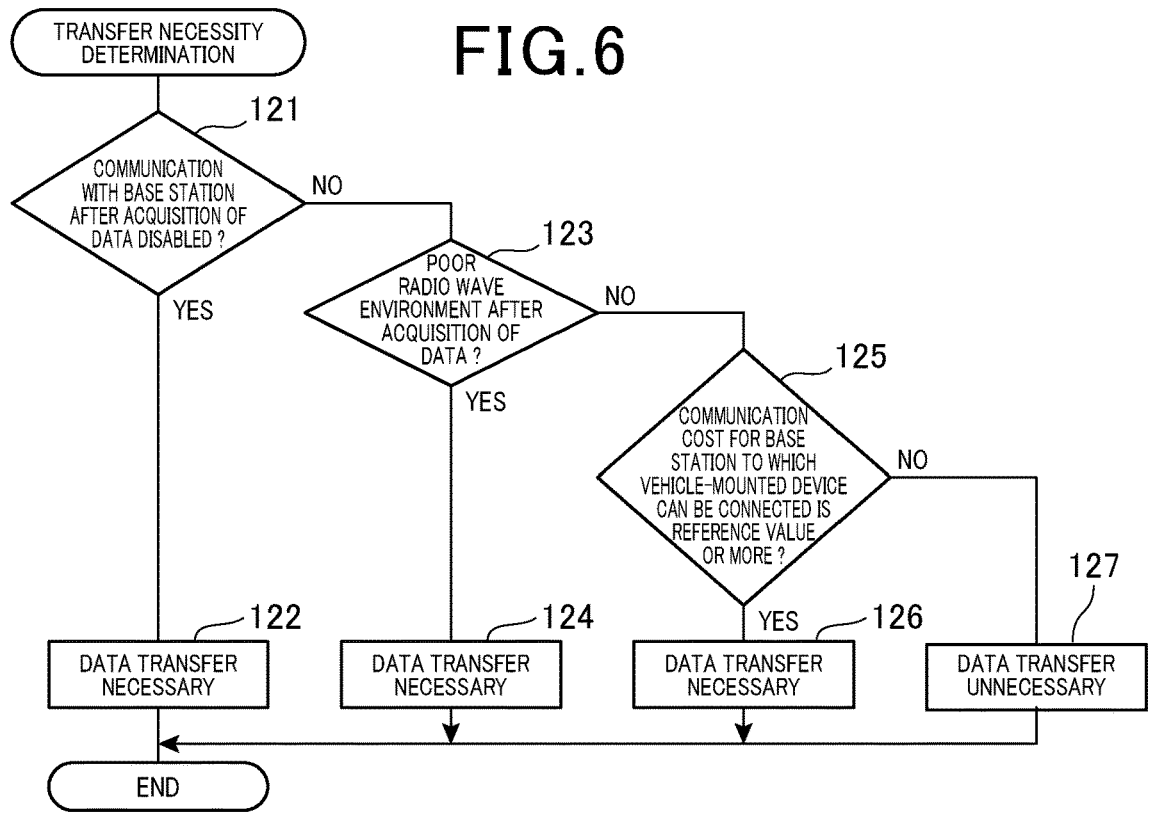
FIG. 6 is a flow chart of a transfer necessity determination.

Subsequently, at step 120, the processing section 54 performs a transfer necessity determination. FIG. 6 shows details of the transfer necessity determination. In the transfer necessity determination, first, at step 121, the processing section 54 determines whether communication after acquisition of data is disabled in the acquisition vehicle V. More specifically, the processing section 54 determines whether a communication disabled state continues during a predetermined delay allowable time after the vehicle-mounted device 1 mounted on the acquisition vehicle V acquires data (hereinafter referred to as request data) to be delivered to the server 5 according to the data request. The communication disabled state is a state in which the vehicle-mounted device 1 cannot communicate with any of the wireless base stations 2.

The determination is performed on the basis of the travel plan of the acquisition vehicle V, the communication area information, and the vehicle-mounted-device-specific communication function information in the storage section 53. When the acquisition vehicle V is not located in a communication area of any of the wireless base stations 2, the vehicle-mounted device 1 of the acquisition vehicle V is in the communication disabled state. When the acquisition vehicle V is located in a communication area of one of the wireless base stations 2, the vehicle-mounted device 1 of the acquisition vehicle V is not in the communication disabled state. The delay allowable time is determined according to the delay limit information in the inquiry information. When no delay limit information is included in the inquiry information, the delay allowable time may be a time corresponding to the event type information in the inquiry information. A correspondence relationship between the event type information and the delay allowable time is stored in advance in the storage section 53. When neither delay limit information nor event type information is included in the inquiry information, the predetermined time may be a fixed value (e.g., 30 minutes).

At step 121, when the processing section 54 determines that the communication after the acquisition of request data is disabled, at step 122, the processing section 54 determines that data transfer is necessary, and the control proceeds to step 130. The data transfer is transmission of request data, through inter-vehicle communication, from an acquisition vehicle including the data acquisition section 12 that has acquired the request data (i.e., an acquisition vehicle that has acquired the request data) to a relay vehicle or from a relay vehicle to a next relay vehicle.

Thus, when the request data cannot be transmitted to the server 5 via the wireless base station 2 after the vehicle-mounted device 1 in the acquisition vehicle V acquires the request data, it is possible to deliver the data to the server by using inter-vehicle communication with another vehicle V.

At step 121, when the processing section 54 determines that the communication after the acquisition of request data is not disabled, the control proceeds to step 123. When the processing section 54 makes a negative determination at both steps 123 and 125, the control proceeds to step 127, and the processing section 54 determines that the data transfer is unnecessary, and the control proceeds to step 130 in FIG. 4.

In the first case shown in FIG. 5, the point X is not included in any of the communication areas of the plurality of wireless base stations 2. In the first case, according to a travel plan R1 of the vehicle A which is a target vehicle V, during the delay allowable time after the vehicle A passes through the vicinity of the point X, the vehicle A continues to travel outside the communication area of the wireless base station 2 to which the vehicle-mounted device 1 of the vehicle A can be connected. In the case shown in FIG. 5, therefore, the processing section 54 causes control to proceed from step 121 to step 122.

At step 122, the processing section 54 determines that the data transfer is necessary, and the control proceeds to step 130 in FIG. 4. At step 130, on the basis of the determination result at step 120, the processing section 54 determines whether data transfer to another vehicle V is necessary.

At step 130, when the processing section 54 determines that the data transfer is unnecessary, the processing section 54 ends the data request process 54c. In this case, the vehicle-mounted device 1 mounted on the acquisition vehicle V itself can transmit the request data for the point X acquired by the vehicle-mounted device 1 to the server 5 via the wireless base station 2 without passing through the vehicle-mounted device 1 of another vehicle V. Thus, the processing section 54 does not need to calculate a data transfer path.

At step 130, when the processing section 54 determines that the data transfer is necessary, the control proceeds to step 140, and the processing section 54 searches for a data transfer path. When the data transfer is necessary, in this scenario, the request data will not reach the server 5 in a desired form during the delay allowable time unless the request data is transmitted through the vehicle-mounted device 1 mounted on a vehicle V other than the acquisition vehicle V.

Thus, at step 130, the processing section 54 searches for a communication path through which the request data sequentially passes from the acquisition vehicle V through one or more relay vehicles V by inter-vehicle communication and from the last vehicle V among the relay vehicles V, the request data finally reaching the server via the wireless base station 2. Hereinafter, such a communication path is referred to as a data transfer path.

The data transfer path may be searched for, for example, by the following procedure. First, on the basis of the travel plans of the plurality of vehicles V, the processing section 54 searches for a first relay vehicle V that passes through the vicinity of the acquisition vehicle V within the delay allowable time after the acquisition vehicle V passes through the vicinity of the point X.

Then, the processing section 54 determines whether a state in which the vehicle-mounted device 1 of the first relay vehicle V found in this manner cannot communicate with any of the wireless base stations 2 will continue during the delay allowable time after the first relay vehicle V passes through the vicinity of the acquisition vehicle V. The time within the delay allowable time means a time within the allowable time after the acquisition vehicle V acquires the request data.

When the processing section 54 determines that the above state does not continue, the processing section 54 determines, as the data transfer path, a communication path through which the request data is passed in the order of the acquisition vehicle V, the first relay vehicle V, and the server 5.

When the processing section 54 determines that the above state continues, on the basis of the travel plans of the plurality of vehicles V, the processing section 54 searches for a second relay vehicle V that passes through the vicinity of the first relay vehicle V within the delay allowable time after the first relay vehicle V passes through the vicinity of the acquisition vehicle. The time within the delay allowable time means a time within the allowable time after the acquisition vehicle V acquires the request data.

Then, the processing section 54 determines whether a state in which the vehicle-mounted device 1 of the second relay vehicle V found in this manner cannot communicate with any of the wireless base stations 2 continues during the delay allowable time after the second relay vehicle V passes through the vicinity of the first relay vehicle V. The time within the delay allowable time means a time within the allowable time after the acquisition vehicle V acquires the request data.

When the processing section 54 determines that the above state does not continue, the processing section 54 determines, as the data transfer path, a communication path through which the request data is passed in the order of the acquisition vehicle V, the first relay vehicle V, the second relay vehicle V, and the server 5.

When the processing section 54 determines that the above state continues, the processing section 54 searches for a third relay vehicle by the same method as the above methods of searching for the first and second relay vehicles. This process is repeated until the data transfer path is determined.

Alternatively, in some cases, a state in which the vehicle-mounted device 1 of the third relay vehicle V cannot communicate with any of the wireless base stations 2 continues during the delay allowable time after the third relay vehicle V passes through the vicinity of the second relay vehicle V. In such a case, without searching for a fourth relay vehicle V, the processing section 54 may determine that no search result has been obtained. Furthermore, when no relay vehicle such as the first relay vehicle, the second relay vehicle, or the third relay vehicle is found, the processing section 54 determines that no search result has been obtained.

In the first case shown in FIG. 5, according to a travel plan R2 of a vehicle B belonging to the plurality of vehicles V, after the vehicle A passes through the vicinity of the point X, the vehicle B and the vehicle A pass each other. Thus, the vehicle B passes through the vicinity of the vehicle A. Then, within the delay allowable time after the vehicle B passes through the vicinity of the vehicle A, the vehicle B enters the communication area of the wireless base station 2. In the first case, therefore, the vehicle B is the first relay vehicle. Thus, the processing section 54 determines, as the data transfer path, a communication path of the acquisition vehicle A, the first relay vehicle B, and the server 5.

In the first case shown in FIG. 5, according to a travel plan R3 of a vehicle C belonging to the plurality of vehicles V, after the vehicle A passes through the vicinity of the point X, the vehicle C travels alongside the vehicle A. Thus, the vehicle C passes through the vicinity of the vehicle A. However, within the delay allowable time after the vehicle C passes through the vicinity of the vehicle A, the vehicle C does not enter the communication area of any of the wireless base stations 2. In the first case, therefore, the vehicle C is not the first relay vehicle.

Subsequently, at step 150, the processing section 54 determines whether, as a result of the search at step 140, a data transfer path has been found, i.e., whether a search result has been obtained. When the processing section 54 determines that no search result has been obtained, the processing section 54 ends the data request process 54c. In this case, no transfer path is present for the request data acquired by the acquisition vehicle V.

At step 150, when the processing section 54 determines that the search result has been obtained, the control proceeds to step 160. Then, by using the communication section 51, the processing section 54 transmits transfer information via the wide-area network 4 and one of the wireless base stations 2 to the vehicle-mounted device 1 of the vehicle V that performs the data transfer by inter-vehicle communication. In the first case, the transfer information is transmitted only to the acquisition vehicle V. The first relay vehicle B in the first case transmits the request data to the server 5 without using inter-vehicle communication, and thus the transfer information is not transmitted to the first relay vehicle B.

When the communication path of the acquisition vehicle V, the first relay vehicle V, the second relay vehicle V, and the server 5 is determined as the data transfer path, the transfer information is transmitted to the acquisition vehicle V and the first relay vehicle V, and the transfer information is not transmitted to the second relay vehicle V.

The vehicle-mounted device 1 mounted on the vehicle V to which the transfer information is transmitted corresponds to a data transfer terminal. The transfer information is information indicating, for example, a vehicle V including the vehicle-mounted device 1 to which the request data is to be transferred by a vehicle V. The transfer information includes information such as a procedure ID, a transfer destination address, a transfer allowable time limit, backup presence information, and an acquisition time.

The procedure ID is the same as the procedure ID included in the data request transmitted at immediately preceding step 110. The transfer destination address is information indicating an address (e.g., MAC address) of the vehicle-mounted device 1 mounted on the vehicle V to which the request data is transferred. In the first case, the transfer destination address in the transfer information transmitted to the vehicle-mounted device 1 of the acquisition vehicle A indicates an address of the vehicle-mounted device 1 mounted on the first relay vehicle B.

The transfer allowable time limit indicates the latest time at which the request data can be transferred to a next vehicle V. The processing section 54 determines a set value of the transfer allowable time limit to be a predetermined time after (e.g., 15 minutes after) a time point at which a vehicle V that transfers the request data passes through the vicinity of a vehicle V that receives the transferred request data. The time point at which the vehicle V that transfers the request data passes through the vicinity of the vehicle V that receives the transferred request data is determined on the basis of the travel plans of the two vehicles.

If the request data cannot be transferred when the allowable time limit is exceeded, a change in the travel route or a delay in movement is highly likely to have occurred in one of the two vehicles. If the request data cannot be transferred when the allowable time limit is exceeded, therefore, it is preferable to cancel the transfer of the request data and transmit the request data by another method.

The backup presence information is information indicating whether in the vehicle-mounted device 1 that transmits the request data to a next vehicle V, the request data is to be backed up in the vehicle-mounted device 1 and transmitted later to the server 5 without passing through the vehicle-mounted device 1 of another vehicle. The acquisition time is a time at which the request data is acquired by the acquisition vehicle A.

The processing section 54 determines a value of the backup presence information on the basis of priority of the request data. Thus, if in the data request transmitted immediately before, request data having priority higher than a predetermined criterion is requested, the processing section 54 sets the value of the backup presence information to "backup present", and if not, the processing section 54 sets the value of the backup presence information to "no backup present".

The processing section 54 may determine the priority of the request data on the basis of the event type information included in the data request transmitted immediately before. For example, the event type information indicating the type "parking lot vacancy information" or "traffic jam situation" may have higher priority than the event type information indicating the type "accident situation". In this case, when the event type information in the data request transmitted immediately before indicates the type "accident situation", the processing section 54 may set the value of the backup presence information to "backup present". When the event type information in the data request transmitted immediately before indicates the type "parking lot vacancy information" or "traffic jam situation", the processing section 54 may set the value of the backup presence information to "no backup present".

Furthermore, when the event type information in the data request transmitted immediately before is the "parking lot vacancy information", as an amount of traffic on a road closest to the point X is increased, the processing section 54 may set the priority of the request data higher. The processing section 54 can acquire information on the amount of traffic on the road closest to the point X from another communication device (e.g., traffic information server) on the wide-area network 4 by using the communication section 51.

In some cases, within a past predetermined time (e.g., 1 hour) to the current time, the processing section 54 receives, the reference number of times (e.g., 10 times) or more, inquiry information including the "parking lot vacancy information" as the event type information and including the point X as the target position information. In such a case, the processing section 54 may set the value of the backup presence information to "backup present". Otherwise, the processing section 54 may set the value of the backup presence information to "no backup present".

The data request transmitted from the server 5 as described above is received by the vehicle-mounted device 1 mounted on the acquisition vehicle V via the wide-area network 4 and the wireless base station 2. This wireless base station 2 is one of the plurality of wireless base stations 2 to which the vehicle-mounted device 1 is wirelessly connected.

Figure 7:
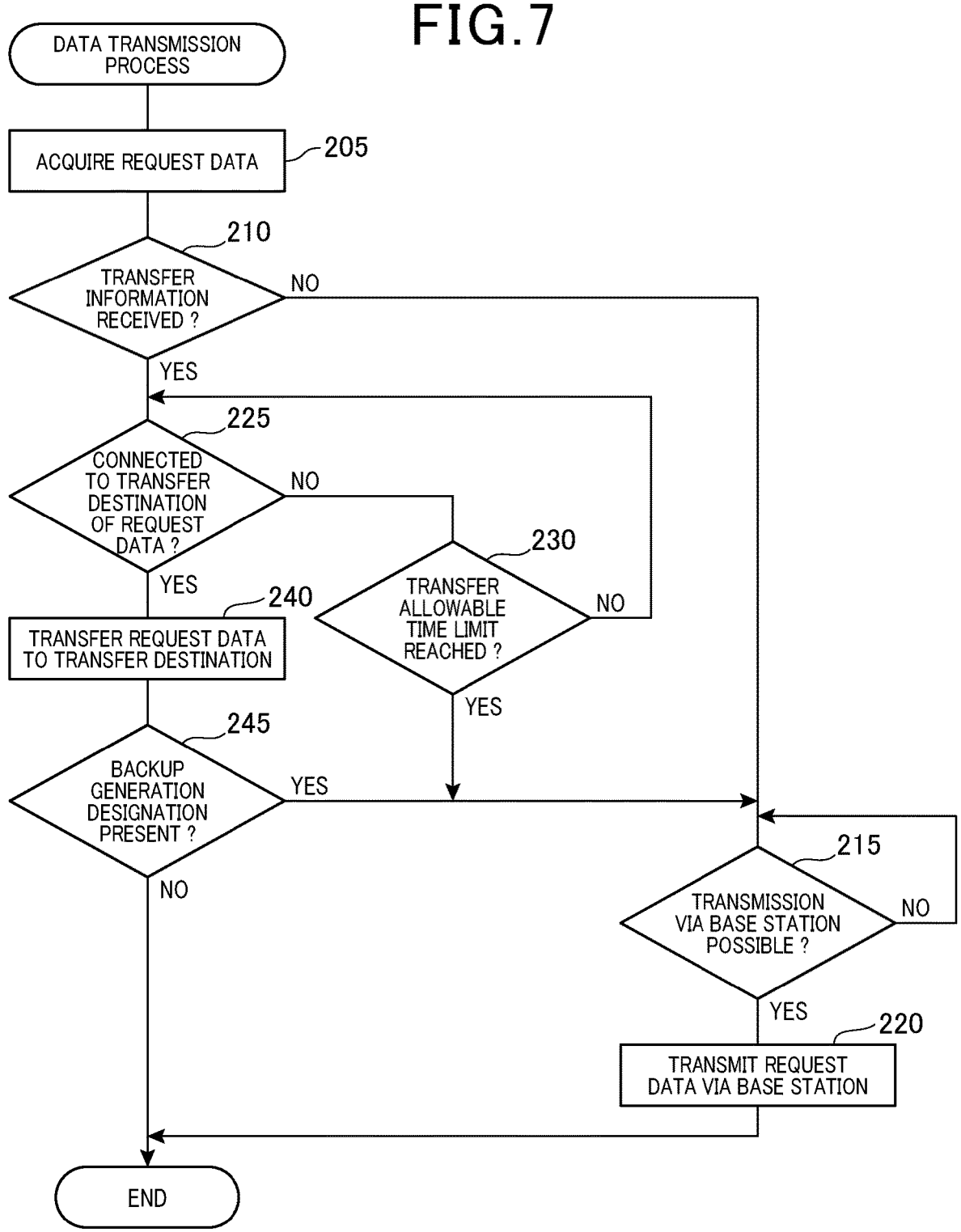
FIG. 7 is a flow chart of a data transmission process.

Operation of the vehicle-mounted device 1 that receives the data request transmitted from the processing section 54 of the server 5 at step 110 will be described below. In the first case, the vehicle-mounted device 1 is mounted on the acquisition vehicle A. The control section 14 of the vehicle-mounted device 1 receives the data request via the communication section 11 and the wireless base station 2 to which the communication section 11 is connected. Then, the control section 14 starts the data transmission process 14*c*. FIG. 7 shows details of the data transmission process 14*c*.

In the data transmission process 14*c*, first, at step 205, the control section 14 acquires data requested in the data request. Specifically, on the basis of a signal acquired from the vehicle speed sensor, the acceleration sensor, the satellite navigation receiver, or the like of the data acquisition section 12, the control section 14 repeatedly determines a current position of the acquisition vehicle V. Then, when the acquisition vehicle has reached the vicinity of the position X indicated by the target position information in the data request, by using the data acquisition section 12, the control section 14 acquires data indicated by the data identification information in the data request.

For example, when the data identification information indicates a captured image, the control section 14 captures an image of the surroundings of the acquisition vehicle V by using the camera of the data acquisition section 12. From the captured image obtained as a result of the image capturing, for example, an accident situation or a parking lot vacancy state can be determined. For example, when the data identification information indicates a vehicle speed, the control section 14 determines a vehicle speed of the acquisition vehicle V on the basis of a detection signal of the vehicle speed sensor of the data acquisition section 12.

Subsequently, at step 210, the control section 14 determine whether the above-described transfer information has been received during a predetermined period. The predetermined period is a period from the reception of the data request until the control section 14 acquires the request data at step 205. The transfer information is received via the communication section 11 and the wireless base station 2 to which the communication section 11 is currently connected.

When the transfer information has been received, the control section 14 causes the control to proceed from step 210 to step 225. When the transfer information has not been received, the control section 14 causes the control to proceed from step 210 to step 215.

At step 215, the control section 14 determines whether a condition for transmitting the request data to the server 5 via one of the plurality of wireless base stations 2 is satisfied. For example, in the first case, when the communication section 11 is connected to one of the plurality of wireless base stations 2, the control section 14 may determine that the condition for transmitting the request data to the server 5 via one of the plurality of wireless base stations 2 is satisfied. Thus, in the first case, when the acquisition vehicle V is located in one of the communication areas of the plurality of wireless base stations 2, the control section 14 may determine that the condition for transmitting the request data to the server 5 via one of the plurality of wireless base stations 2 is satisfied. Furthermore, in the first case, when the communication section 11 is not connected to any of the plurality of wireless base stations 2, the control section 14 may determine that the condition for transmitting the request data to the server 5 via one of the plurality of wireless base stations 2 is not satisfied. Thus, in the first case, when the acquisition vehicle V is not located in any of the communication areas of the plurality of wireless base stations 2, the control section 14 may determine that the condition for transmitting the request data to the server 5 via one of the plurality of wireless base stations 2 is not satisfied.

When the control section 14 determines that the condition for transmitting the request data to the server 5 via one of the plurality of wireless base stations 2 is not satisfied, the control section 14 performs the determination at step 215 again. Thus, at step 215, the control section 14 waits until the condition for transmitting the request data to the server 5 via one of the plurality of wireless base stations 2 is satisfied.

When the condition for transmitting the request data to the server 5 via one of the plurality of wireless base stations 2 is satisfied, the control section 14 causes the control to proceed from step 215 to step 220. Specifically, in the first case, when the communication section 11 is connected to one of the plurality of wireless base stations 2, the control section 14 causes the control to proceed from step 215 to step 220.

At step 220, by using the communication section 11, the control section 14 transmits the request data to the server 5 via the wireless base station 2 to which the communication section 11 is connected and the wide-area network 4. In some cases, while step 215 is repeated, the current time exceeds, by a time indicated by the delay limit information in the data request, the time at which the request data is acquired by the data acquisition section 12. In such a case, the control section 14 may eliminate the request data and end the data transmission process 14c without transmitting the request data to the server 5.

At step 225, the control section 14 determines whether inter-vehicle communication with the vehicle-mounted device 1 of the vehicle V serving as a transfer destination of the request data is possible. The vehicle-mounted device 1 of the vehicle V serving as the transfer destination is determined on the basis of the transfer destination address in the transfer information received from the server 5.

In the first case, the vehicle V serving as the transfer destination is the first relay vehicle B. When the acquisition vehicle V is located in the vicinity of the vehicle V serving as the transfer destination, the inter-vehicle communication is possible between the vehicle-mounted device 1 of the acquisition vehicle V and the vehicle-mounted device 1 of the vehicle V serving as the transfer destination. When the acquisition vehicle V is not located in the vicinity of the vehicle V serving as the transfer destination, inter-vehicle communication is impossible between the vehicle-mounted device 1 of the acquisition vehicle V and the vehicle-mounted device 1 of the vehicle V serving as the transfer destination.

At step 225, when the control section 14 determines that the inter-vehicle communication with the vehicle-mounted device 1 of the vehicle V serving as the transfer destination of the request data is impossible, the control proceeds to step 230. At step 230, the control section 14 determines whether the transfer allowable time limit included in the received transfer information is reached. When the control section 14 determines that the transfer allowable time limit is not reached, the control returns to step 225.

Thus, the control section 14 repeats the processes at steps 225 and 230 until the inter-vehicle communication with the transfer destination of the request data becomes possible or the transfer allowable time limit is reached.

During the repetition of the processes, if the transfer allowable time limit is reached before the inter-vehicle communication with the transfer destination of the request data becomes possible, at step 230, the control section 14 determines that the transfer allowable time limit is reached, and the control proceeds to step 215. Such a situation occurs, for example, when a change in the travel route or a delay in movement has occurred in the acquisition vehicle V or the vehicle V serving as the transfer destination. In such a situation, in some cases, by cancelling the transfer of the request data and transmitting the request data from the vehicle-mounted device 1 of the acquisition vehicle to the server 5 via one of the wireless base stations 2 without through another vehicle-mounted device 1, it is eventually possible to transmit the request data earlier.

After the control proceeds from step 230 to step 215, the process is performed as already described. Roughly speaking, at step 215, the control section 14 waits until the condition for transmitting the request data to the server 5 via one of the plurality of wireless base stations 2 is satisfied, and when the condition is satisfied, at step 220, the control section 14 transmits the request data to the server 5 without through another vehicle-mounted device 1.

When the inter-vehicle communication with the transfer destination of the request data becomes possible while steps 225 and 230 are being repeated, the control section 14 causes the control to proceed from step 225 to step 240. At step 240, by using the communication section 11, the control section 14 transfers the request data, by inter-vehicle communication, to the vehicle-mounted device 1 serving as the transfer destination with which the communication has become possible. In the request data to be transferred, the control section 14 includes the procedure ID included in the data request due to which the request data is acquired.

Subsequently, at step 245, the control section 14 determines whether backup generation designation is present. Thus, the control section 14 determines whether the backup presence information included in the received transfer information indicates "backup present". When no backup generation designation is present, the control section 14 ends the data transmission process 14c.

When the backup generation designation is present, the control proceeds from step 245 to step 215. After the control proceeds from step 245 to step 215, the process is performed as already described. Roughly speaking, when the condition for transmitting the request data to the server 5 via one of the plurality of wireless base stations 2 is satisfied, at step 220, the control section 14 transmits the request data to the server 5 without passing through another vehicle-mounted device 1. Thus, even if request data having relatively high priority is not delivered to the server 5 through the vehicle-mounted device 1 serving as the transfer destination, the vehicle-mounted device 1 of the acquisition vehicle V itself transmits the request data to the server 5 without through another vehicle-mounted device 1. Therefore, the request data is more likely to be delivered to the server 5.

The request data transmitted from the vehicle-mounted device 1 by inter-vehicle communication in the data transmission process 14c is received by the vehicle-mounted device 1 of the first relay vehicle V serving as the transfer destination. When the request data is received, the control section 14 of the vehicle-mounted device 1 of the first relay vehicle V starts the data relay process 14d.

Figure 8:
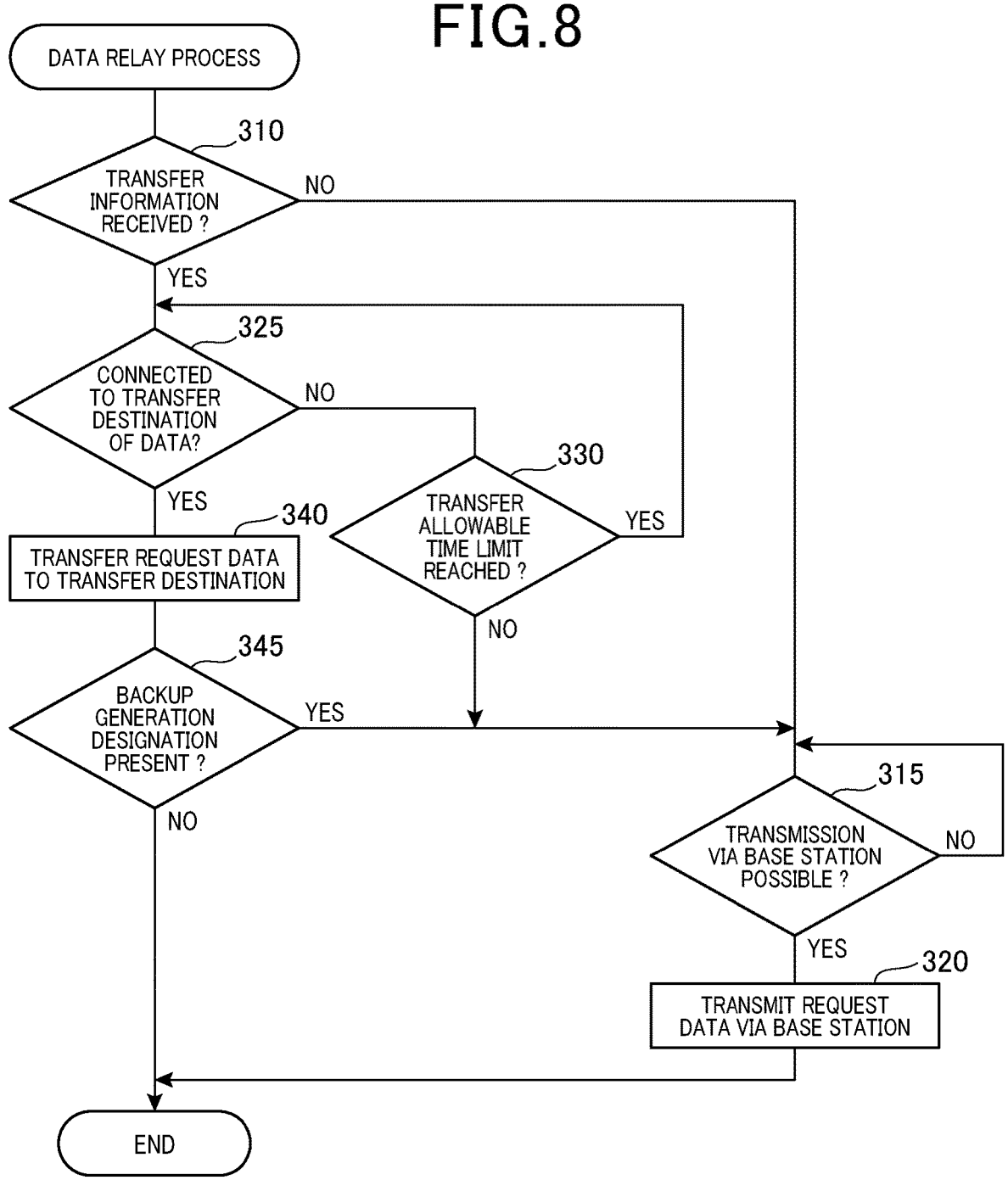
FIG. 8 is a flow chart of a data relay process.

In the data relay process 14d, as shown in FIG. 8, first, at step 310, the control section 14 determines whether transfer information corresponding to the received request data has been received before the reception of the request data.

A correspondence relationship between the request data and the transfer information is determined on the basis of the procedure ID included in the request data and the procedure ID included in the transfer information. Specifically, when the procedure ID included in the request data is the same as the procedure ID included in the transfer information, the request data and the transfer information correspond to each other. When the procedure ID included in the request data is not the same as the procedure ID included in the transfer information, the request data and the transfer information do not correspond to each other.

In the first case shown in FIG. 5, the first relay vehicle B is determined to transmit the request data to the server 5, and thus the transfer information is not transmitted to the vehicle-mounted device 1 of the first relay vehicle B. In the first case, therefore, at step 310, the control section 14 of the first relay vehicle B determines that the transfer information has not been received.

At step 310, when the control section 14 determines that the transfer information has not been received, the control proceeds to step 315, and when the control section 14 determines that the transfer information has been received, the control proceeds to step 325.

At step 315, the control section 14 determines whether the condition for transmitting the request data to the server 5 via one of the plurality of wireless base stations 2 is satisfied. Specifically, in the first case, the control section 14 determines whether the communication section 11 is connected to one of the plurality of wireless base stations 2 or connected to none of the plurality of wireless base stations 2. When the condition is not satisfied, the control section 14 performs the determination at step 315 again. Thus, at step 315, the control section 14 waits until the condition is satisfied.

When the condition is satisfied, the control section 14 causes the control to proceed from step 315 to step 320. Specifically, in the first case, when the communication section 11 is connected to one of the plurality of wireless base stations 2, the control section 14 causes the control to proceed from step 315 to step 320.

At step 320, by using the communication section 11, the control section 14 transmits the request data to the server 5 via the wireless base station 2 to which the communication section 11 is connected and the wide-area network 4. In some cases, while step 315 is repeated, the current time exceeds, by a time indicated by the delay limit information in the data request, the time at which the request data is acquired by the data acquisition section 12. In such a case, the control section 14 may eliminate the request data and end the data relay process 14d without transmitting the request data to the server 5.

Unlike the first case shown in FIG. 5, when a data transfer path including the second relay vehicle V is implemented, at step 310, the control section 14 of the second relay vehicle V determines that the transfer information corresponding to the request data received immediately before has been received before the reception of the request data. In this case, the control section 14 causes the control to proceed from step 310 to step 325.

In the same manner as the process at step 225 of the data transmission process 14c, at step 325, the control section 14 determines whether inter-vehicle communication with the vehicle-mounted device 1 of the vehicle V serving as a next transfer destination of the request data is possible.

At steps 325 and 330, the control section 14 performs the same processes as the processes at steps 225 and 230 of the data transmission process 14c, respectively. Thus, the control section 14 repeats the processes at steps 325 and 330 until the inter-vehicle communication with the next transfer destination of the request data becomes possible or the transfer allowable time limit is reached.

During the repetition of these processes, if the transfer allowable time limit is reached before the inter-vehicle communication with the next transfer destination of the request data becomes possible, at step 330, the control section 14 determines that the transfer allowable time limit is reached, and control proceeds to step 315. After control proceeds from step 330 to step 315, the process is performed as already described.

When the inter-vehicle communication with the next transfer destination of the request data becomes possible while steps 325 and 330 are repeated, the control section 14 causes control to proceed from step 325 to step 340. At step 340, by using the communication section 11, the control section 14 transfers the request data, by inter-vehicle communication, to the vehicle-mounted device 1 serving as the transfer destination with which the communication has become possible. In the request data to be transferred, the control section 14 includes the procedure ID included in the data request due to which the request data has been acquired.

Subsequently, at step 345, by performing the same process as the process at step 245 of the data transmission process 14c, the control section 14 determines whether backup generation designation is present. When no backup generation designation is present, the control section 14 ends the data relay process 14d.

When the backup generation designation is present, control proceeds from step 345 to step 315. After control proceeds from step 345 to step 315, the process is performed as already described. Thus, even if request data having relatively high priority is not delivered to the server 5 through the vehicle-mounted device 1 serving as the next transfer destination, the vehicle-mounted device 1 of the relay vehicle V on which the control section 14 is mounted transmits the request data to the server 5 without further through another vehicle-mounted device 1. Therefore, the request data is more likely to be delivered to the server 5.

For example, in some cases, a data transfer path of the acquisition vehicle V, the first relay vehicle V, the second relay vehicle V, and the server 5 is implemented. In such a case, when the backup generation designation is present, the vehicle-mounted device 1 of the acquisition vehicle V, the vehicle-mounted device 1 of the first relay vehicle V, and the vehicle-mounted device 1 of the second relay vehicle V all transmit the request data to the server 5 without it passing through another vehicle-mounted device 1. Therefore, the request data is highly likely to be delivered to the server 5.

Thus, in the first case, as shown in FIG. 5, outside the communication area P of the wireless base station 2, the request data is transferred from the vehicle-mounted device 1 of the acquisition vehicle A to the vehicle-mounted device 1 of the first relay vehicle B. Then, when the first relay vehicle B enters the communication area P, the control proceeds from step 315 to step 320 of the data relay process 14d, and the control section 14 of the first relay vehicle B transmits the request data to the server 5 via the wireless base station 2. This makes it possible to more promptly transmit the request data to the server 5 by using inter-vehicle communication.

A second case will be described below with reference to FIG. 9. In the second case, the vehicle-mounted devices 1 mounted on the vehicles A and B belonging to the plurality of vehicles V are always located in a communication area of the wireless base station 2 in a range of FIG. 9. However, even the communication area of the wireless base station 2 has a place with a good communication environment and a place with a poor communication environment. When the vehicle-mounted device 1 is located in the place with the poor communication environment, a data transfer speed is low, and thus an excessively long time may be required to transmit the request data.

Figure 9:
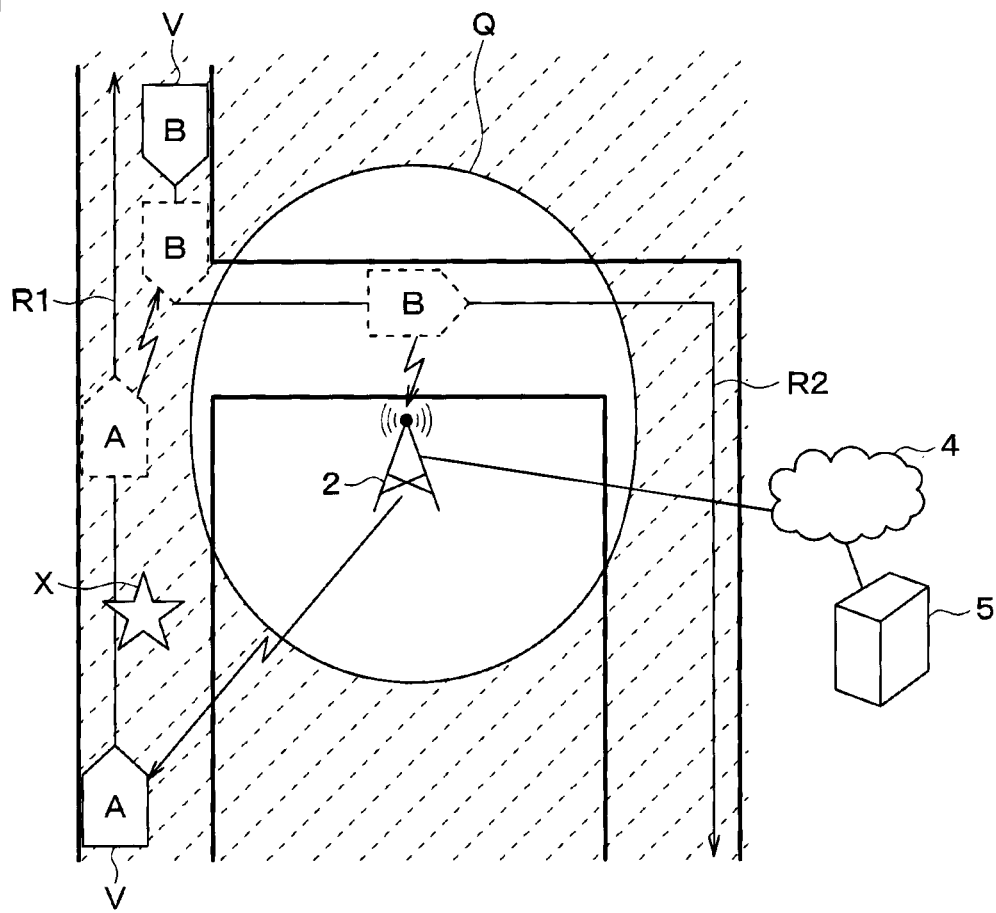
FIG. 9 is a diagram schematically showing a second case.

In the second case shown in FIG. 9, the point X at which required information can be acquired is located in the place with the poor communication environment for communicating with the wireless base station 2. According to the travel plan R1, the vehicle A that is planned to pass through the vicinity of the point X passes through only the place with the poor communication environment for communicating with the wireless base station 2. According to the travel plan R2, the vehicle B passes through the vicinity of the vehicle A that has passed through the point X, and then the vehicle B enters an area Q that has a good communication environment for communicating with the wireless base station 2.

In such a case, at steps 105 and 110 of the data request process 54c, the processing section 54 of the server 5 performs the operation as described above. Specifically, when inquiry information is received, at step 105, the processing section 54 selects the vehicle A as the acquisition vehicle V that matches the inquiry information, and at step 110, the processing section 54 transmits the data request to the vehicle A.

Then, at step 121 of the transfer necessity determination at step 120, as described above, the processing section 54 determines that the communication after the acquisition of request data is not disabled in the acquisition vehicle V. This is because according to the travel plan R1, also after the vehicle A passes through the vicinity of the point X, the vehicle A travels in the communication area of the wireless base station 2.

Then, the processing section 54 causes the control to proceed from step 121 to step 123. At step 123, the processing section 54 determines whether in the vehicle-mounted device 1 of the acquisition vehicle V, a communication environment for communicating with the wireless base station 2 within the delay allowable time after the acquisition of request data is poorer than a predetermined criterion. This wireless base station 2 is one of the wireless base stations 2 with which the vehicle-mounted device 1 of the acquisition vehicle V can communicate after the vehicle-mounted device 1 of the acquisition vehicle V acquires the request data.

Quality of the communication environment for communicating with the wireless base station 2 is determined by a plurality of types of factors for each point.

For example, the quality of the communication environment is determined by geographic features of a target point and an area around the point and a congestion degree of the wireless base station 2. The congestion degree of the wireless base station 2 is increased as the number of terminals that perform communication via the wireless base station 2 is increased and as a communication data amount per unit time via the wireless base station 2 is increased.

At step 123, on the basis of the travel plan of the acquisition vehicle V, the communication quality level table of the wireless base station 2, and the base station situation information on the wireless base station 2, the processing section 54 determines quality of the communication environment for the vehicle-mounted device 1 of the acquisition vehicle V to communicate with the wireless base station 2 after the vehicle-mounted device 1 of the acquisition vehicle V acquires the request data.

The plurality of communication quality level tables stored in the storage section 53 have a one-to-one correspondence with the plurality of wireless base stations 2. Each of the plurality of communication quality level tables is a table in which, for a set of position information (i.e., latitude, longitude) on a point in a communication area of the corresponding one of the plurality of wireless base stations 2 and a congestion degree of the wireless base station 2, a single value of the communication quality level of the wireless base station 2 at the point is determined. A better communication environment has a higher value of the communication quality level. For example, the value of the communication quality level may be a value indicating an amount of data that can be communicated per unit time between the vehicle-mounted device 1 and the wireless base station 2. Furthermore, the value of the communication quality level may be set so that a higher quality level has a larger numerical value in a plurality of stages (e.g., 5 stages).

The plurality of pieces of base station situation information stored in the storage section 53 have a one-to-one correspondence with the plurality of wireless base stations 2. Each of the plurality of pieces of base station situation information includes information on the latest connected terminal number and the latest communication data amount of the corresponding one of the plurality of wireless base stations 2.

The connected terminal number is the total number of terminals that are simultaneously connected to the wireless base station 2. The terminals counted in the total number include the vehicle-mounted devices 1 and terminals other than the vehicle-mounted devices 1. The communication data amount is a communication data amount per unit time in communication via the wireless base station 2, and the unit is, for example, bits/second.

The processing section 54 of the server 5 repeatedly and periodically communicates with the plurality of wireless base stations 2 via the communication section 51 and the wide-area network 4. Accordingly, from each of the plurality of wireless base stations 2, the processing section 54 acquires information on the connected terminal number and the communication data amount of the corresponding one of the plurality of wireless base stations 2, and overwrites the information in the storage section 53. Thus, the processing section 54 repeatedly and periodically updates, in the storage section 53, the information on the connected terminal number and the communication data amount of each of the plurality of wireless base stations 2.

The content of the process performed by the processing section 54 at step 123 will be described in detail below. First, on the basis of the communication area information and the travel plan of the acquisition vehicle V, the processing section 54 determines one of the wireless base stations 2 with which the vehicle-mounted device 1 of the acquisition vehicle V can communicate within the delay allowable time after the vehicle-mounted device 1 of the acquisition vehicle V acquires the request data. The delay allowable time is determined according to the delay limit information in the inquiry information.

Subsequently, from the base station situation information on the determined wireless base station 2, the processing section 54 reads a connected terminal number and a communication data amount of the wireless base station 2. Furthermore, on the basis of the read connected terminal number and communication data amount, the processing section 54 calculates a congestion degree of the wireless base station 2. A higher congestion degree is calculated for a larger connected terminal number and a larger communication data amount.

Subsequently, on the basis of the travel plan of the acquisition vehicle V and the communication area information, the processing section 54 calculates a plurality of positions in the communication area of the wireless base station 2 at which the acquisition vehicle V travels within the delay allowable time after the acquisition vehicle V passes through the vicinity of the point X. Furthermore, for each of the calculated plurality of positions, the processing section 54 applies, to the communication quality level table of the wireless base station 2, a set of the corresponding one of the plurality of positions and the congestion degree calculated earlier. This makes it possible to acquire a value of the communication quality level of the wireless base station 2 at each of the calculated plurality of positions.

Next, on the basis of the value of the communication quality level of the wireless base station 2 at each of the plurality of positions, the processing section 54 determines whether the value of the communication quality level of communicate with the wireless base station 2 is lower than a predetermined reference value during the entire delay allowable time after the acquisition of request data. The predetermined reference value is, for example, a fixed value. When the processing section 54 determines that the value of the communication quality level is lower than the predetermined reference value, the control proceeds to step 124, and when the processing section 54 determines that the value of the communication quality level is not lower than the predetermined reference value, the control proceeds to step 125.

In the second case shown in FIG. 9, due to line congestion or low radio wave intensity, a communication quality level on the travel route of the acquisition vehicle A is lower than the predetermined reference value, and thus the processing section 54 causes the control to proceed from step 123 to step 124.

At step 124, the processing section 54 determines that the data transfer is necessary, and the control proceeds to step 130. Thus, when the communication quality level of communicate with the plurality of wireless base stations 2 is lower than the predetermined reference value after the vehicle-mounted device 1 in the acquisition vehicle V acquires the request data, it is possible to deliver the data to the server in a better communication environment by using inter-vehicle communication with the relay vehicle V.

The subsequent operation of the processing section 54 is performed as already described. Briefly describing according to the second case, at step 130, when the processing section 54 determines that the transfer of the request data from the acquisition vehicle V to another vehicle is necessary, at step 140, the processing section 54 searches for a data transfer path through which the request data is passed in the order of the acquisition vehicle A, the first relay vehicle B, and the server 5.

In the second case, at step 140, the data transfer path may be searched for, for example, by the following procedure. First, on the basis of the travel plans of the plurality of vehicles V, the processing section 54 searches for a first relay vehicle B that passes through the vicinity of the acquisition vehicle A within the delay allowable time after the acquisition vehicle A passes through the vicinity of the point X.

Then, the processing section 54 determines whether a state in which the vehicle-mounted device 1 of the first relay vehicle B found in this manner cannot communicate with any of the wireless base stations 2 at a higher communication quality level than the predetermined reference value continues during the delay allowable time after the first relay vehicle B passes through the vicinity of the acquisition vehicle A. For the determination, as described above, the travel plan of the first relay vehicle B, the communication quality level tables of the plurality of wireless base stations 2, and the base station situation information on the wireless base stations 2 are used. The time within the delay allowable time means a time within the allowable time after the acquisition vehicle A acquires the request data.

When the processing section 54 determines that the above state does not continue, the processing section 54 determines, as the data transfer path, a communication path through which the request data is passed in the order of the acquisition vehicle V, the first relay vehicle V, and the server 5.

When the processing section 54 determines that the above state continues, on the basis of the travel plans of the plurality of vehicles V, the processing section 54 searches for a second relay vehicle V that passes through the vicinity of the first relay vehicle V within the delay allowable time after the first relay vehicle V passes through the vicinity of the acquisition vehicle. The time within the delay allowable time means a time within the allowable time after the acquisition vehicle V acquires the request data.

Then, the processing section 54 determines whether a state in which the vehicle-mounted device 1 of the found second relay vehicle V cannot communicate with any of the wireless base stations 2 in a good communication environment continues during the delay allowable time after the second relay vehicle V passes through the vicinity of the first relay vehicle V. For the determination, as described above, the travel plan of the second relay vehicle V, the communication quality level tables of the plurality of wireless base stations 2, and the base station situation information on the wireless base stations 2 are used. The time within the delay allowable time means a time within the allowable time from the acquisition time in the transfer information. The acquisition time is a time at which the acquisition vehicle A acquires the request data.

When the processing section 54 determines that the above state does not continue, the processing section 54 determines, as the data transfer path, a communication path through which the request data is passed in the order of the acquisition vehicle A, the first relay vehicle B, the second relay vehicle V, and the server 5.

When the processing section 54 determines that the above state continues, the processing section 54 searches for a third relay vehicle by the same method as the above methods of searching for the first and second relay vehicles. This process is repeated until the data transfer path is determined.

Alternatively, in some cases, a state in which the vehicle-mounted device 1 of the third relay vehicle V cannot communicate with any of the wireless base stations 2 in a good communication environment continues during the delay allowable time after the third relay vehicle V passes through the vicinity of the second relay vehicle V. In such a case, without searching for a fourth relay vehicle V, the processing section 54 may determine that no search result has been obtained. Furthermore, when no relay vehicle such as the first relay vehicle, the second relay vehicle, or the third relay vehicle is found, the processing section 54 determines that no search result has been obtained.

In the second case shown in FIG. 9, according to the travel plan R2 of the vehicle B, after the vehicle A passes through the vicinity of the point X, the vehicle B and the vehicle A pass each other. Thus, the vehicle B passes through the vicinity of the vehicle A. Then, within the delay allowable time after the vehicle B passes through the vicinity of the vehicle A, the vehicle B enters the communication area of the wireless base station 2. In the case, therefore, the vehicle B is the first relay vehicle. Thus, the processing section 54 determines, as the data transfer path, a communication path of the acquisition vehicle A, the first relay vehicle B, and the server 5. Furthermore, the control proceeds from step 150 to step 160, and the processing section 54 transmits the transfer information to the acquisition vehicle A.

In the vehicle-mounted device 1 of the acquisition vehicle A, the control section 14 receives the data request and the transfer information via the communication section 11. The operation of the control section 14 at that time is performed as already described. Briefly describing according to the second case, upon receipt of the data request, the control section 14 starts the data transmission process 14*c*, and at step 205, the control section 14 acquires request data. Then, in response to the transfer information having been received, the control proceeds from step 210 to step 225, and the control section 14 repeatedly makes a negative determination at steps 225 and 230. At this time, even if possible, the control section 14 does not transmit the request data via the wireless base station 2.

When the acquisition vehicle A enters the vicinity of the first relay vehicle B, the control section 14 of the acquisition vehicle A establishes a wireless connection to the vehicle-mounted device 1 of the first relay vehicle B serving as the transfer destination of the request data. Then, the control proceeds to step 240, and the control section 14 transmits the request data to the vehicle-mounted device 1 of the first relay vehicle B by inter-vehicle communication.

When the transfer information is not received before the acquisition of request data, the control section 14 causes the control to proceed from step 210 to step 215. Furthermore, when the transfer allowable time limit is reached before the connection to the vehicle-mounted device 1 of the first relay vehicle B is established, the control section 14 causes the control to proceed from step 230 to step 215. Furthermore, when the control section 14 determines that the backup generation designation is present, the control proceeds from step 245 to step 215.

At step 215, as already described, the control section 14 determines whether the condition for transmitting the request data to the server 5 via one of the plurality of wireless base stations 2 is satisfied. In the second case, when the communication section 11 can communicate with one of the plurality of wireless base stations 2 in a better communication environment than a predetermined criterion, the control section 14 of the acquisition vehicle A may determine that the condition for transmitting the request data to the server 5 via one of the plurality of wireless base stations 2 is satisfied. Furthermore, in the second case, when the communication section 11 cannot communicate with any of the plurality of wireless base stations 2 in a better communication environment than the predetermined criterion, the control section 14 of the acquisition vehicle A may determine that the condition is not satisfied.

The control section 14 may determine whether the communication section 11 can communicate with one of the wireless base stations 2 in a better communication environment than the predetermined criterion, by actually communicating with the wireless base station 2. Specifically, the control section 14 actually transmits dummy data having a predetermined data size to the wireless base station 2, and receives, from the wireless base station 2, a time at which the wireless base station 2 has completely received the dummy data. Then, on the basis of a time from the start of the transmission of the dummy data to the completion of the reception of the dummy data by the wireless base station 2 and the data size of the dummy data, the control section 14 calculates a data transmission speed. When the calculated data transmission speed is higher than a threshold, the control section 14 determines that the communication section 11 can communicate with the wireless base station 2 in a better communication environment than the predetermined criterion.

When the relay vehicle B passes through the vicinity of the acquisition vehicle A, in the vehicle-mounted device 1 of the relay vehicle B, upon receipt of the request data from the acquisition vehicle A, the control section 14 performs the data relay process 14*d*. The process performed by the control section 14 in the data relay process 14*d* is as already described. Briefly describing according to the second case, upon receipt of the data request, the control section 14 starts the data relay process 14*d*. Then, in response to the transfer information having not been received at step 310, the control proceeds from step 310 to step 315.

Although different from the second case, when the control section 14 determines at step 310 that the transfer information has been received, the control section 14 performs the subsequent process as already described. At this time, if the transfer allowable time limit is reached before the connection to the vehicle-mounted device 1 of the second relay vehicle V is established, the control section 14 causes the control to proceed from step 330 to step 315. Furthermore, when the control section 14 determines that the backup generation designation is present, the control proceeds from step 345 to step 315. Furthermore, when the connection to the vehicle-mounted device 1 of the second relay vehicle V is established before the transfer allowable time limit is reached, then at step 340, the control section 14 transmits the request data to the vehicle-mounted device 1 of the second relay vehicle V by inter-vehicle communication.

At step 315, as already described, the control section 14 determines whether the condition for transmitting the request data to the server 5 via one of the plurality of wireless base stations 2 is satisfied. In the second case, when the communication section 11 can communicate with one of the plurality of wireless base stations 2 in a better communication environment than a predetermined criterion, the control section 14 of the first relay vehicle B may determine that the condition for transmitting the request data to the server 5 via one of the plurality of wireless base stations 2 is satisfied. Furthermore, in the second case, when the communication section 11 cannot communicate with any of the plurality of wireless base stations 2 in a better communication environment than the predetermined criterion, the control section 14 of the first relay vehicle B may determine that the condition is not satisfied. In the same manner as at step 215 of the data transmission process 14*c*, the control section 14 may determine whether the communication section 11 can communicate with one of the wireless base stations 2 in a better communication environment than the predetermined criterion.

Thus, in the second case, as shown in FIG. 9, outside the area Q that has a good communication environment for communicating with the wireless base station 2, the request data is transferred from the vehicle-mounted device 1 of the acquisition vehicle A to the vehicle-mounted device 1 of the first relay vehicle B. Then, when the first relay vehicle B enters the area Q, the control proceeds from step 315 to step 320 of the data relay process 14*d*, and the control section 14 of the first relay vehicle B transmits the request data to the server 5 via the wireless base station 2. This makes it possible to more promptly and more stably transmit the request data to the server 5 by using a good communication environment.

A third case will be described below with reference to FIG. 10. In the third case, the vehicle-mounted devices 1 mounted on the vehicles A and B belonging to the plurality of vehicles V are always located in communication areas of wireless base stations 2A and 2B in a range of FIG. 10. The wireless base stations 2A and 2B both belong to the plurality of wireless base stations 2.

The wireless base station 2A and the wireless base station 2B differ from each other in communication system and communication cost. For example, the wireless base station 2A uses a communication system according to a mobile communication system, and the wireless base station 2B uses a communication system according to a wireless LAN. The communication cost of using the wireless base station 2A is higher than the communication cost of using the wireless base station 2B. A communication cost for one of the wireless base stations 2 is an amount charged for communication of a unit data amount via the wireless base station 2.

The communication section 11 of the vehicle-mounted device 1 mounted on the acquisition vehicle A can be wirelessly connected to the wireless base station 2A. However, the communication section 11 of the vehicle-mounted device 1 mounted on the acquisition vehicle A does not have a function of being wirelessly connected to the wireless base station 2B, and thus the communication section 11 cannot perform communication via the wireless base station 2B. The communication section 11 of the vehicle-mounted device 1 mounted on the first relay vehicle B can be wirelessly connected to both of the wireless base stations 2A and 2B.

Figure 10:
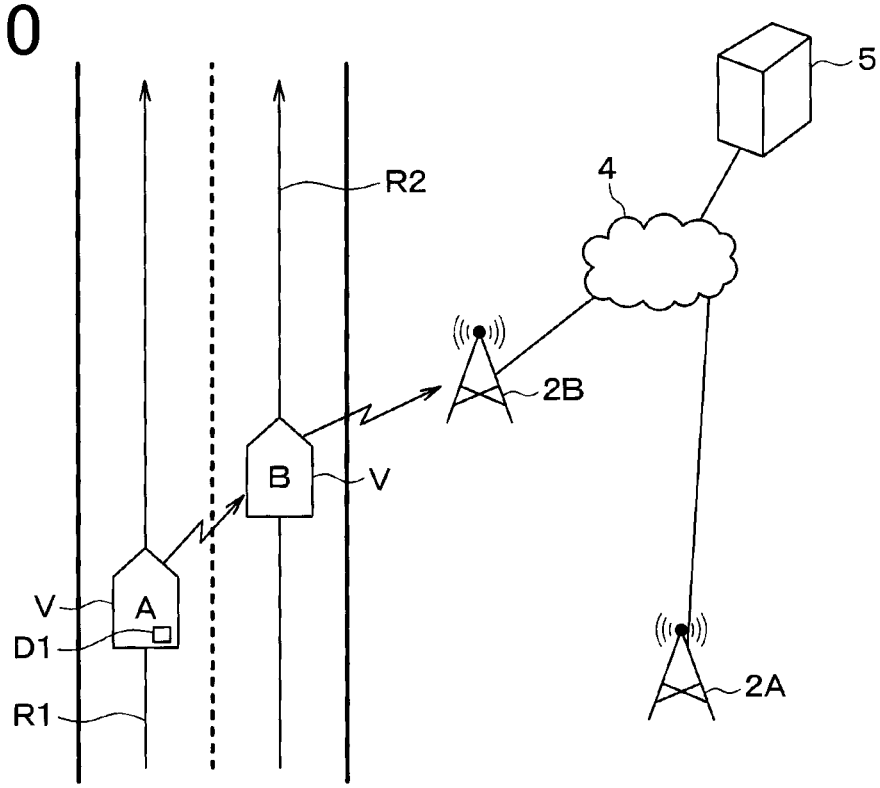
FIG. 10 is a diagram schematically showing a third case.

At the time point shown in FIG. 10, the vehicle-mounted device 1 of the acquisition vehicle A has already acquired request data D1 in the vicinity of the point X (not shown). Furthermore, at the time point shown in FIG. 10, the acquisition vehicle A has entered the vicinity of the first relay vehicle B within the transfer allowable time limit after the acquisition of the request data D1. Furthermore, at the time point shown in FIG. 10, the acquisition vehicle B has entered both the communication area of the wireless base station 2A and the communication area of the wireless base station 2B.

In such a case, at steps 105 and 110 of the data request process 54c, the processing section 54 of the server 5 performs the operation as described above. Specifically, when inquiry information is received, at step 105, the processing section 54 selects the acquisition vehicle A as the acquisition vehicle V that matches the inquiry information, and at step 110, the processing section 54 transmits the data request to the acquisition vehicle A.

Then, at step 121 of the transfer necessity determination at step 120, as described above, the processing section 54 determines that the communication after the acquisition of request data is not disabled in the acquisition vehicle A. This is because according to the travel plan R1, also after the vehicle A passes through the vicinity of the point X, the vehicle A travels in the communication area of the wireless base station 2A.

Then, the processing section 54 causes the control to proceed from step 121 to step 123. At step 123, the processing section 54 determines that, in the vehicle-mounted device 1 of the acquisition vehicle A, the communication environment for communicating with the wireless base station 2 after the acquisition of request data is better than the predetermined criterion, and the control proceeds to step 125.

Subsequently, at step 125, the processing section 54 determines whether a communication cost for one of the wireless base stations 2 to which the vehicle-mounted device 1 of the acquisition vehicle A can be connected within the delay allowable time after the acquisition of request data is a reference value or more. Specifically, on the basis of the communication area information and the travel plan of the acquisition vehicle A, the processing section 54 determines one of the wireless base stations 2 to which the vehicle-mounted device 1 of the acquisition vehicle A can be connected within the delay allowable time after the acquisition of request data. When a wireless communication system of the wireless base station 2 is the wireless communication system according to the wireless LAN standard, the processing section 54 determines that the communication cost for the wireless base station 2 is less than the reference value. When the wireless communication system of the wireless base station 2 is the wireless communication system according to the mobile communication system standard, the processing section 54 determines that the communication cost for the wireless base station 2 is the reference value or more.

In the third case shown in FIG. 10, the wireless communication system of the wireless base station 2 is the wireless communication system according to the wireless LAN standard, and thus the processing section 54 determines that the communication cost is the reference value or more, and the control proceeds from step 125 to step 126.

At step 126, the processing section 54 determines that the data transfer is necessary, and the control proceeds to step 130. Thus, when a high communication cost is required for the wireless base station 2 to which the vehicle-mounted device 1 in the acquisition vehicle A can be connected after the vehicle-mounted device 1 in the acquisition vehicle A acquires the request data, it is possible to deliver the request data to the server 5 in a communication environment at a lower cost by using inter-vehicle communication with the relay vehicle B.

The subsequent operation of the processing section 54 is performed as already described. Briefly describing according to the third case, at step 130, when the processing section 54 determines that the transfer of the request data from the acquisition vehicle A to another vehicle is necessary, at step 140, the processing section 54 searches for a data transfer path through which the request data is passed in the order of the acquisition vehicle A, the first relay vehicle B, and the server 5.

In the third case, at step 140, the data transfer path may be searched for, for example, by the following procedure. First, on the basis of the travel plans of the plurality of vehicles V, the processing section 54 searches for a first relay vehicle B that passes through the vicinity of the acquisition vehicle A within the delay allowable time after the acquisition vehicle A passes through the vicinity of the point X.

Then, the processing section 54 determines whether a state in which the first relay vehicle B found in this manner cannot communicate with any of the wireless base stations 2 at a communication cost less than the reference value continues during the delay allowable time after the first relay vehicle B passes through the vicinity of the acquisition vehicle A. For the determination, the travel plan of the second relay vehicle V and the communication area information are used. The time within the delay allowable time means a time within the allowable time after the acquisition vehicle V acquires the request data.

When the processing section 54 determines that the above state does not continue, the processing section 54 determines, as the data transfer path, a communication path through which the request data is passed in the order of the acquisition vehicle A, the first relay vehicle B, and the server 5.

When the processing section 54 determines that the above state continues, on the basis of the travel plans of the plurality of vehicles V, the processing section 54 searches for a second relay vehicle V that passes through the vicinity of the first relay vehicle B within the delay allowable time after the first relay vehicle B passes through the vicinity of the acquisition vehicle. The time within the delay allowable time means a time within the allowable time after the acquisition vehicle V acquires the request data.

Then, the processing section 54 determines whether a state in which the vehicle-mounted device 1 of the found second relay vehicle V cannot communicate with any of the wireless base stations 2 at a communication cost less than the reference value continues during the delay allowable time after the second relay vehicle V passes through the vicinity of the first relay vehicle V. For the determination, the travel plan of the second relay vehicle V and the communication area information are used. The time within the delay allowable time means a time within the allowable time after the acquisition vehicle V acquires the request data.

When the processing section 54 determines that the above state does not continue, the processing section 54 determines, as the data transfer path, a communication path through which the request data is passed in the order of the acquisition vehicle A, the first relay vehicle B, the second relay vehicle V, and the server 5.

When the processing section 54 determines that the above state continues, the processing section 54 searches for a third relay vehicle by the same method as the above methods of searching for the first and second relay vehicles. This process is repeated until the data transfer path is determined.

Alternatively, in some cases, a state in which the vehicle-mounted device 1 of the third relay vehicle V cannot communicate with any of the wireless base stations 2 at a communication cost less than the reference value continues during the delay allowable time after the third relay vehicle V passes through the vicinity of the second relay vehicle V. In such a case, without searching for a fourth relay vehicle V, the processing section 54 may determine that no search result has been obtained. Furthermore, when no relay vehicle such as the first relay vehicle, the second relay vehicle, or the third relay vehicle is found, the processing section 54 determines that no search result has been obtained.

In the third case shown in FIG. 10, the processing section 54 determines, as the data transfer path, a communication path of the acquisition vehicle A, the first relay vehicle B, and the server 5. Furthermore, the control proceeds from step 150 to step 160, and the processing section 54 transmits the transfer information to the acquisition vehicle A.

In the vehicle-mounted device 1 of the acquisition vehicle A, the control section 14 receives the data request and the transfer information via the communication section 11. The operation of the control section 14 at that time is performed as already described. Briefly describing according to the third case, upon receipt of the data request, the control section 14 starts the data transmission process 14c, and at step 205, the control section 14 acquires request data. Then, in response to the transfer information having been received, the control proceeds from step 210 to step 225, and the control section 14 repeatedly makes a negative determination at steps 225 and 230. At this time, even if possible, the control section 14 does not transmit the request data via the wireless base station 2A.

When the acquisition vehicle A enters the vicinity of the first relay vehicle B, the control section 14 of the acquisition vehicle A establishes a wireless connection to the vehicle-mounted device 1 of the first relay vehicle B serving as the transfer destination of the request data. Then, the control proceeds to step 240, and the control section 14 transmits the request data to the vehicle-mounted device 1 of the first relay vehicle B by inter-vehicle communication.

When the transfer information is not received before the acquisition of request data, the control section 14 causes the control to proceed from step 210 to step 215. Furthermore, when the transfer allowable time limit is reached before the connection to the vehicle-mounted device 1 of the first relay vehicle B is established, the control section 14 causes the control to proceed from step 230 to step 215. Furthermore, when the control section 14 determines that the backup generation designation is present, the control proceeds from step 245 to step 215.

At step 215, as already described, the control section 14 determines whether the condition for transmitting the request data to the server 5 via one of the plurality of wireless base stations 2 is satisfied. In the third case, when the communication section 11 can communicate with one of the plurality of wireless base stations 2, the control section 14 of the acquisition vehicle A may determine that the condition for transmitting the request data to the server 5 via one of the plurality of wireless base stations 2 is satisfied. Furthermore, in the third case, when the communication section 11 cannot communicate with any of the plurality of wireless base stations 2, the control section 14 of the acquisition vehicle A may determine that the condition is not satisfied.

When the control section 14 determines that the condition for transmitting the request data to the server 5 via one of the plurality of wireless base stations 2 is satisfied, the control proceeds from step 215 to step 220, and the control section 14 transmits the request data to the server 5 via the wireless base station 2 with which the communication section 11 can communicate. At this time, if the communication section 11 can communicate with two or more of the plurality of wireless base stations 2, the control section 14 transmits the request data to the server 5 via the wireless base station 2 for which a communication cost is lowest.

When the relay vehicle B passes through the vicinity of the acquisition vehicle A, in the vehicle-mounted device 1 of the relay vehicle B, upon receipt of the request data from the acquisition vehicle A, the control section 14 performs the data relay process 14d. The process performed by the control section 14 in the data relay process 14d is as already described. Briefly describing according to the third case, upon receipt of the data request, the control section 14 starts the data relay process 14d. Then, in response to the transfer information having not been received at step 310, the control proceeds from step 310 to step 315.

Although different from the third case, when the control section 14 determines at step 310 that the transfer information has been received, the control section 14 performs the subsequent process as already described. At this time, if the transfer allowable time limit is reached before the connection to the vehicle-mounted device 1 of the second relay vehicle V is established, the control section 14 causes the control to proceed from step 330 to step 315. Furthermore, when the control section 14 determines that the backup generation designation is present, the control proceeds from step 345 to step 315. Furthermore, when the connection to the vehicle-mounted device 1 of the second relay vehicle V is established before the transfer allowable time limit is reached, at step 340, the control section 14 transmits the request data to the vehicle-mounted device 1 of the second relay vehicle V by inter-vehicle communication.

At step 315, as already described, the control section 14 determines whether the condition for transmitting the request data to the server 5 via one of the plurality of wireless base stations 2 is satisfied. In the third case, when the communication section 11 can communicate with one of the plurality of wireless base stations 2, the control section 14 of the first relay vehicle B may determine that the condition for transmitting the request data to the server 5 via one of the plurality of wireless base stations 2 is satisfied. Furthermore, in the third case, when the communication section 11 cannot communicate with any of the plurality of wireless base stations 2, the control section 14 of the first relay vehicle B may determine that the condition is not satisfied.

When the control section 14 determines that the condition for transmitting the request data to the server 5 via one of the plurality of wireless base stations 2 is satisfied, the control proceeds from step 315 to step 320, and the control section 14 transmits the request data to the server 5 via the wireless base station 2 with which the communication section 11 can communicate. At this time, if the communication section 11 can communicate with two or more of the plurality of wireless base stations 2, the control section 14 transmits the request data to the server 5 via the wireless base station 2 for which a communication cost is lowest. In the third case, although the vehicle-mounted device 1 of the first relay vehicle B can communicate with both of the wireless base stations 2A and 2B, the communication cost for the wireless base station 2B is lower. Accordingly, the vehicle-mounted device 1 of the first relay vehicle B transmits the request data to the server 5 via the wireless base station 2B.

Thus, in the third case, as shown in FIG. 10, even when the vehicle-mounted device 1 of the acquisition vehicle A cannot use the wireless base station 2B for which the communication cost is relatively low, the request data is transmitted to the server 5 via the wireless base station 2B by using inter-vehicle communication. This makes it possible to transmit the request data to the server 5 at a lower cost.

As has been described, the processing section 54 of the server 5 searches for a data transfer path on the basis of the travel plan and the communication environment information. The data transfer path is a path through which request data sequentially passes, among the plurality of vehicles V, from the acquisition vehicle V through one or more relay vehicles V by inter-vehicle communication and from the last relay vehicle V among the one or more relay vehicles V, the request data finally reaches the server 5 via the wireless base station 2.

Therefore, a relay vehicle V that is highly likely to be able to deliver the data to the server 5 via the plurality of wireless base stations 2 is selected as the last relay vehicle among the relay vehicles in the data transfer path. This improves the probability that the data is delivered to the server.

For example, a nonpatent literature, B. Hull, V. Bychkovsky, Y. Zhang, K. Chen, M. Goraczko, "A. Miu, E. Shih, H. Balakrishnan, and S. Madden. CarTel: a distributed mobile sensor computing system", Proceedings of the 4th international conference on Embedded networked sensor systems, page 138, 2006, describes a system in which when a vehicle has data to be uploaded to a server and the vehicle is not connected to the Internet, the data is transferred to a surrounding vehicle and then the data is uploaded to the server. In such a technique, however, there is no guarantee that the vehicle to which the data is transferred by using inter-vehicle communication will be connected to the Internet and the data will be transmitted to the server. Furthermore, the determination regarding the transfer of the data can be performed only on the basis of whether the vehicle having the data is connected to a base station.

In the above embodiment, the processing section 54 functions as a travel plan acquisition section by performing step 100, functions as a communication environment acquisition section by performing step 102, and functions as a transfer path calculation section by performing step 140.

The control section 14 functions as an inter-vehicle communication determination section by performing step 225, and functions as a transfer execution section by performing step 240. Furthermore, the control section 14 functions as a backup section by causing the control to proceed from step 245 to steps 215 and 220. Furthermore, the control section 14 functions as a time limit response transmission section by causing the control to proceed from step 245 to steps 215 and 220. FIG. 11 shows a configuration of various data used in the present embodiment.

Other Embodiments

The present disclosure is not limited to the above embodiment and can be changed as appropriate. In the above embodiment, elements constituting the embodiment are not necessarily essential unless, for example, the elements are explicitly stated to be particularly essential or the elements are considered to be apparently essential in principle. In the above embodiment, when a numerical value such as the number, numerical value, amount, or range associated with the components of the embodiment is mentioned, the numerical value is not limited to the specific number unless, for example, the numerical value is explicitly stated to be particularly essential or the numerical value is apparently limited to the specific number in principle. In particular, when a plurality of values for an amount are exemplified, a value between the plurality of values can be adopted unless particularly otherwise specified or the value is apparently impossible in principle. In the above embodiment, when a shape, positional relationship, or the like of the components or the like is mentioned, the shape, positional relationship, or the like is not limited to the specific shape, positional relationship, or the like unless, for example, particularly explicitly stated or the shape, positional relationship, or the like is limited to the specific shape, positional relationship, or the like in principle. The present disclosure encompasses modifications as below of the above embodiment and modifications within an equivalent scope. The modifications below can be selectively and independently applied to the above embodiment. Thus, any combination of the modifications except obviously contradictory combinations is applicable to the above embodiment.

Modified Example 1

Figure 12:
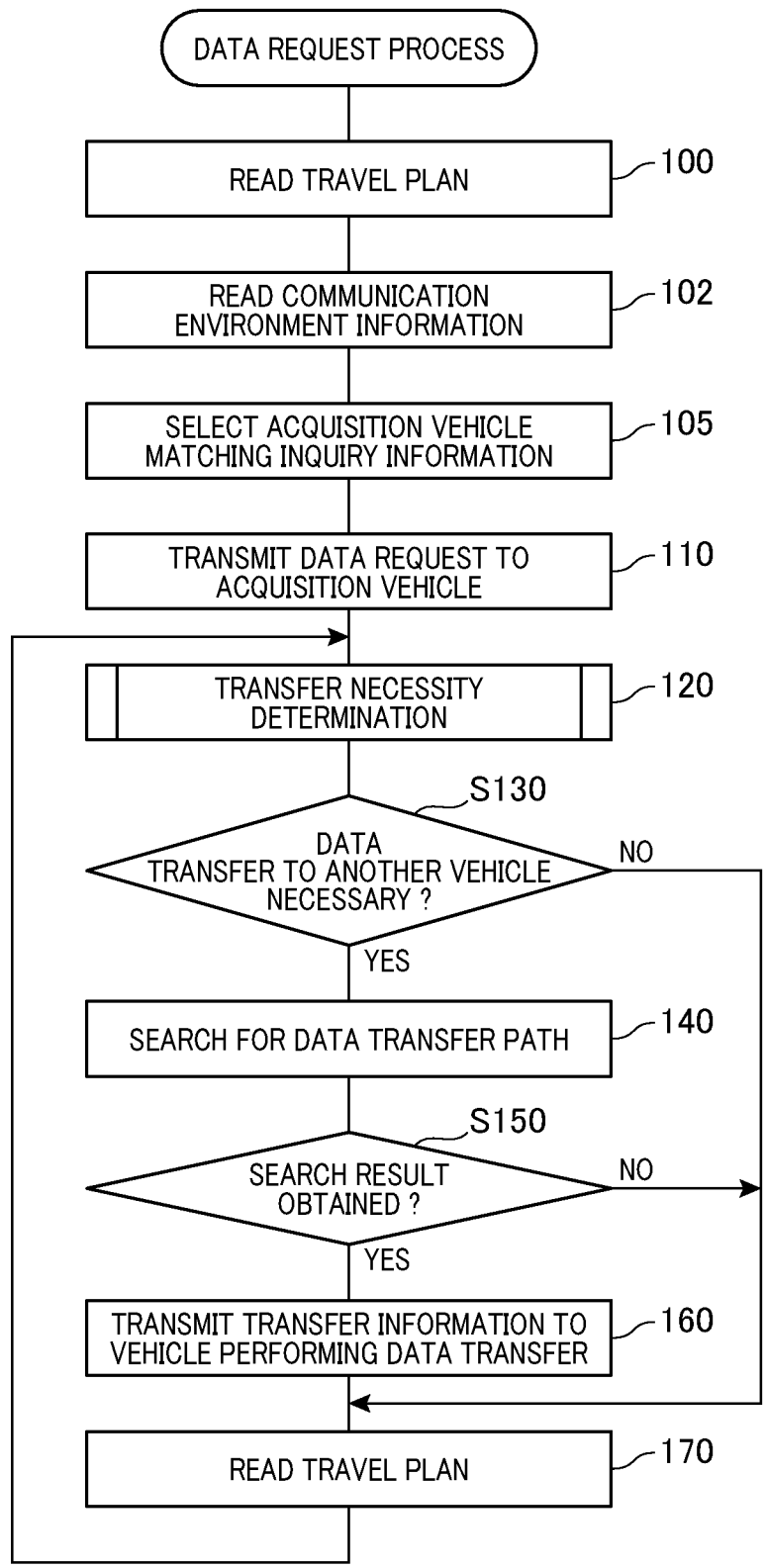
FIG. 12 is a flow chart of a data request process in another example.

In the above embodiment, the processing section 54 performs the processes at step 120 and the subsequent steps only once after the processing section 54 transmits the data request at step 110. However, the processes do not necessarily need to be performed in this manner. For example, as shown in FIG. 12, the processing section 54 may repeat the processes at step 120 and the subsequent steps. Specifically, after the processing section 54 determines at step 130 that the data transfer is unnecessary, after the processing section 54 determines at step 150 that no search result has been obtained, or after the processing section 54 transmits the transfer information at step 160, the processing section 54 may perform step 170 and then the control may return to step 120. At step 170, as at step 100, the latest travel plans of the plurality of vehicles V are read from the storage section 53.

Thus, the processing section 54 can change the necessity of the data transfer and the content of the data transfer path, following a situation that changes with the elapse of time.

For example, in some cases, immediately after transmitting the data request, the processing section 54 determines that the data transfer is unnecessary, but subsequently, the travel plan of the acquisition vehicle V after the acquisition vehicle V passes through the vicinity of the point X is changed, and as a result, the processing section 54 determines that the data transfer is necessary. In such a case, at step 140, the processing section 54 searches for a data transfer path, and at step 160, on the basis of the obtained data transfer path, the processing section 54 transmits the transfer information.

For example, in some cases, the processing section 54 transmits the transfer information on the basis of the data transfer path obtained by searching at step 140 immediately after the processing section 54 transmits the data request, but subsequently, the travel plan of the relay vehicle serving as the transfer destination is changed, and as a result, the processing section 54 obtains a new transfer path. The new transfer path may differ from the original transfer path in the vehicle constituting the relay vehicle.

Furthermore, in some cases, in the data transmission process 14c, the control section 14 of the vehicle-mounted device 1 in the acquisition vehicle V receives a plurality of pieces of transfer information during a period from the reception of the data request until the control section 14 acquires request data. In such a case, the control section 14 can transfer the request data according to the last transfer information among the plurality of pieces of transfer information received during the period. Thus, the control section 14 of the acquisition vehicle V can perform the data transfer, following a situation that changes with the elapse of time.

Furthermore, in the data relay process 14d, when the control section 14 of the vehicle-mounted device 1 in the relay vehicle V receives transfer information during a period until the control section 14 acquires request data, the control section 14 can transfer the request data according to the latest received transfer information. Thus, the control section 14 of the relay vehicle V can perform the data transfer, following a situation that changes with the elapse of time.

Modified Example 2

In the above embodiment, the server 5 which is the destination of the request data also serves as the data transfer path calculation device that calculates a transfer path. However, the data transfer path calculation device may be implemented by a device other than the server 5. For example, the data transfer path calculation device may be mounted on the vehicle.

Modified Example 3

In the above embodiment, the vehicle-mounted device 1 is illustrated as an example of a terminal in the vehicle.

However, the terminal in the vehicle does not need to be the vehicle-mounted device 1 that is always mounted on the vehicle. A communication device such as a smartphone that is temporarily carried in the vehicle in order to achieve the purpose of the vehicle-mounted device 1 as described above also corresponds to an example of the terminal in the vehicle.

According to an aspect of the present disclosure, a data transfer path calculation device includes:

a travel plan acquisition section (100) that acquires a travel plan (R1, R2, R3) composed of a plurality of routes on which a plurality of vehicles (V) are estimated to travel and passage times at which the plurality of vehicles are estimated to pass through a plurality of points on the plurality of routes;

a communication environment acquisition section (102) that, for each of a plurality of wireless base stations (2), acquires communication environment information indicating a communication environment for communicating with the corresponding one of the plurality of wireless base stations at a plurality of points; and a transfer path calculation section (140) that searches for a data transfer path on the basis of the travel plan and the communication environment information, the data transfer path being a path through which data sequentially passes, among the plurality of vehicles, from an acquisition vehicle (A) through one or more relay vehicles (B) by inter-vehicle communication and from a last relay vehicle (B) among the one or more relay vehicles (B), the data finally reaching a server (5) via one of the plurality of wireless base stations.

Thus, the data transfer path calculation device searches for the data transfer path on the basis of the plurality of travel plans of the plurality of vehicles and the communication environment information on the plurality of wireless base stations. Therefore, a relay vehicle that is highly likely to be able to deliver the data to the server via the plurality of wireless base stations is selected as the last relay vehicle among the relay vehicles in the data transfer path. This improves the probability that the data is delivered to the server.

According to another aspect, a data transfer terminal communicating with a data transfer path calculation device (5) that acquires a travel plan (R1, R2, R3) composed of a plurality of routes on which a plurality of vehicles (V) are estimated to travel and passage times at which the plurality of vehicles are estimated to pass through a plurality of points on the plurality of routes, that, for each of a plurality of wireless base stations (2), acquires communication environment information indicating a communication environment for communicating with the corresponding one of the plurality of wireless base stations at a plurality of points, searches for a data transfer path on the basis of the travel plan and the communication environment information, the data transfer path being a path through which data sequentially passes, among the plurality of vehicles, from an acquisition vehicle (A) through one or more relay vehicles (B) by inter-vehicle communication and from the last relay vehicle (B) among the one or more relay vehicles (B), the data finally reaching a server (5) via one of the plurality of wireless base stations, and transmits a transfer destination address to the acquisition vehicle on the basis of the data transfer path obtained as a result of the search, the transfer destination address indicating one of the one or more relay vehicles to which the data is transferred from the acquisition vehicle, the data transfer terminal comprising:

an inter-vehicle communication determination section (225) that determines whether, in the acquisition vehicle, inter-vehicle communication with a terminal (1) indicated by the transfer destination address transmitted from the data transfer path calculation device has become possible; and a transfer execution section (240) that, in response to the inter-vehicle communication determination section determining that the inter-vehicle communication has become possible, transmits the data to the terminal indicated by the transfer destination address.

Thus, when in the acquisition vehicle, inter-vehicle communication with the terminal indicated by the transfer destination address becomes possible, the data transfer terminal transmits the data to the terminal. This improves the probability of delivering data to the server.

Reference numerals in parentheses given to components or the like indicate an example of a correspondence relationship between the components or the like and specific components or the like in the embodiment described above.

What is claimed is:

1. A data transfer path calculation device comprising:
a travel plan acquisition section that acquires a travel plan composed of a plurality of routes on which a plurality of vehicles are estimated to travel and passage times at which the plurality of vehicles are estimated to pass through a plurality of points on the plurality of routes;
a communication environment acquisition section that, for each of a plurality of wireless base stations, acquires communication environment information indicating a communication environment for communicating with the corresponding one of the plurality of wireless base stations at a plurality of points; and
a transfer path calculation section that searches for a data transfer path on the basis of the travel plan and the communication environment information, the data transfer path being a path through which data sequentially passes, among the plurality of vehicles, from an acquisition vehicle through one or more relay vehicles by inter-vehicle communication and from a last relay vehicle among the one or more relay vehicles, the data finally reaching a server via one of the plurality of wireless base stations, wherein the transfer path calculation section searches for the data transfer path in response to one or more of:
a state in which a terminal in the acquisition vehicle is not able to communicate with any of the plurality of wireless base stations continuing during a delay allowable time after the terminal acquires the data;
a quality level of a communication environment for the terminal in the acquisition vehicle to communicate with the plurality of wireless base stations within the delay allowable time after the terminal acquires the data being lower than a predetermined reference value; or
a communication cost for one or more of the plurality of wireless base stations to which the terminal in the acquisition vehicle can be connected within the delay allowable time after the terminal acquires the data being a reference value or more.

2. The data transfer path calculation device according to claim 1, wherein in response to the travel plan having been changed, the transfer path calculation section changes the data transfer path.

3. A data transfer terminal communicating with a data transfer path calculation device that acquires a travel plan composed of a plurality of routes on which a plurality of vehicles are estimated to travel and passage times at which the plurality of vehicles are estimated to pass through a plurality of points on the plurality of routes, that, for each of a plurality of wireless base stations,
acquires communication environment information indicating a communication environment for communicating with the corresponding one of the plurality of wireless base stations at a plurality of points,
searches for a data transfer path on the basis of the travel plan and the communication environment information, the data transfer path being a path through which data sequentially passes, among the plurality of vehicles, from an acquisition vehicle through one or more relay vehicles by inter-vehicle communication and from the last relay vehicle among the one or more relay vehicles, the data finally reaching a server via one of the plurality of wireless base stations, and
transmits a transfer destination address to the acquisition vehicle on the basis of the data transfer path obtained as a result of the search, the transfer destination address indicating one of the one or more relay vehicles to which the data is transferred from the acquisition vehicle, the data transfer terminal comprising:
an inter-vehicle communication determination section that determines whether, in the acquisition vehicle, inter-vehicle communication with a terminal indicated by the transfer destination address transmitted from the data transfer path calculation device has become possible; and
a transfer execution section that, in response to the inter-vehicle communication determination section determining that the inter-vehicle communication has become possible, transmits the data to the terminal indicated by the transfer destination address,
wherein, in response to a change in the data transfer path:
the inter-vehicle communication determination section determines whether inter-vehicle communication has become possible with a terminal indicated by, among a plurality of transfer destination addresses received during a period until the data is acquired, the last transfer destination address, and
in response to the inter-vehicle communication determination section determining that the inter-vehicle communication has become possible, the transfer execution section transmits the data to the terminal indicated by the last transfer destination address.

4. The data transfer terminal according to claim 3, further comprising a backup section that, after the transfer execution section transmits the data to the transfer destination address, transmits the data to the server via one of the plurality of wireless base stations.

5. The data transfer terminal according to claim 3, further comprising a time limit response transmission section that, when a transfer allowable time limit is reached before the inter-vehicle communication determination section determines that the inter-vehicle communication has become possible, transmits the data to the server via one of the plurality of wireless base stations.

* * * * *